(12) United States Patent
Hwang et al.

(10) Patent No.: US 12,287,017 B2
(45) Date of Patent: Apr. 29, 2025

(54) COLLECTION APPARATUS FOR COLLECTING PARTICULATE MATTER GENERATED IN BRAKE SYSTEM OF TRANSPORT FACILITY

(71) Applicant: KOREA INSTITUTE OF CERAMIC ENGINEERING AND TECHNOLOGY, Jinju-si (KR)

(72) Inventors: Kwang Taek Hwang, Seoul (KR); Jin Ho Kim, Seoul (KR); Junghun Kim, Pohang-si (KR); Cheongsoo Choi, Changwon-si (KR)

(73) Assignee: KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 740 days.

(21) Appl. No.: 17/541,153

(22) Filed: Dec. 2, 2021

(65) Prior Publication Data

US 2022/0205499 A1    Jun. 30, 2022

(30) Foreign Application Priority Data

Dec. 29, 2020    (KR) .................. 10-2020-0185420

(51) Int. Cl.
*F16D 65/00* (2006.01)
*B01D 46/00* (2022.01)
(Continued)

(52) U.S. Cl.
CPC ..... *F16D 65/0031* (2013.01); *B01D 46/0002* (2013.01); *B01D 46/103* (2013.01);
(Continued)

(58) Field of Classification Search
CPC ............ F16D 65/0031; B01D 46/0002; B01D 46/103; B01D 2275/307; B01D 2279/40;
(Continued)

(56) References Cited

U.S. PATENT DOCUMENTS 5,098,455 A * 3/1992 Doty .................... C04B 35/185
                                                    428/116
9,291,222 B2 * 3/2016 Hummel ............. F16D 65/0031
(Continued)

FOREIGN PATENT DOCUMENTS

CN          112094107 A     12/2020
JP          2003080080 A     3/2003
(Continued)

OTHER PUBLICATIONS

Il Sun Hwang & Young Lim Lee , Experimental and Numerical Analysis on Vehicle Brake Filter Flow, 2019 Symposium of the Korean Society Korean Society of Automotive Engineering of Automotive Engineers, Nov. 2019, pp. 485, The Korean Society of Automotive Engineers, Seoul, Republic of Korea.

*Primary Examiner* — Thomas W Irvin
(74) *Attorney, Agent, or Firm* — STIP Law Group, LLC

(57) ABSTRACT

The present invention relates to a collection apparatus for collecting particulate matter generated due to friction between a rotor and a brake pad in a brake system of a transport facility, the collection apparatus including a first collector configured to surround a portion of an outer side surface of the rotor, an upper collector configured to surround a portion of an outer peripheral surface of the rotor, and a second collector configured to surround a portion of an inner side surface of the rotor, wherein the first collector and the second collector are made of porous ceramic foam. According to the present invention, particulate matter generated due to friction between a rotor and a brake pad in a brake system of a transport facility can be efficiently collected, and by reducing the amount of particulate matter generated when braking a transport facility, air pollution can be prevented.

17 Claims, 23 Drawing Sheets

(51) Int. Cl.
  *B01D 46/10* (2006.01)
  *C04B 35/10* (2006.01)
  *C04B 35/553* (2006.01)
  *C04B 38/00* (2006.01)
  *C04B 103/00* (2006.01)
  *C04B 111/00* (2006.01)
  *C04B 111/40* (2006.01)

(52) U.S. Cl.
  CPC ............ *C04B 35/10* (2013.01); *C04B 35/553* (2013.01); *C04B 38/0051* (2013.01); *B01D 2275/307* (2013.01); *B01D 2279/40* (2013.01); *C04B 2103/0025* (2013.01); *C04B 2111/00017* (2013.01); *C04B 2111/40* (2013.01)

(58) Field of Classification Search
  CPC ................ C04B 35/10; C04B 38/0051; C04B 2103/0025; C04B 2111/00017; C04B 2111/40
  See application file for complete search history.

(56) References Cited

U.S. PATENT DOCUMENTS

| | | | |
|---|---|---|---|
| 9,388,867 B2 * | 7/2016 | Hummel | F16D 65/092 |
| 11,020,696 B2 * | 6/2021 | Vincent | C04B 35/10 |
| 11,773,929 B2 * | 10/2023 | Kuemmerling | F16D 65/0031 |
| | | | 188/73.31 |
| 11,796,019 B2 * | 10/2023 | Kaufmann | F16D 65/0031 |
| 11,883,770 B2 * | 1/2024 | Nakashima | B01D 46/2482 |
| 2010/0065387 A1 * | 3/2010 | Tsiberidis | F16D 65/0031 |
| | | | 188/218 A |
| 2014/0054120 A1 * | 2/2014 | Hummel | F16D 65/0031 |
| | | | 55/385.3 |
| 2014/0054121 A1 * | 2/2014 | Hummel | F16D 65/0031 |
| | | | 55/522 |
| 2020/0278002 A1 | 9/2020 | Bock et al. | |
| 2021/0053005 A1 * | 2/2021 | Takeno | F01N 3/022 |
| 2021/0121944 A1 * | 4/2021 | Li | B22C 9/086 |

FOREIGN PATENT DOCUMENTS

| | | |
|---|---|---|
| JP | 2007309406 A | 11/2007 |
| KR | 100522041 B1 | 10/2005 |
| KR | 20170085015 A | 7/2017 |

* cited by examiner

COLLECTION APPARATUS FOR COLLECTING PARTICULATE MATTER GENERATED IN BRAKE SYSTEM OF TRANSPORT FACILITY

CROSS-REFERENCE TO RELATED APPLICATIONS

This application claims the priority of the Korean Patent Applications NO 10-2020-0185420 filed on Dec. 29, 2020, in the Korean Intellectual Property Office, the disclosure of which is incorporated herein by reference.

TECHNICAL FIELD

The present invention relates to a collection apparatus, and more particularly, to a collection apparatus for collecting particulate matter generated due to friction between a rotor and a brake pad in a brake system of a transport facility.

BACKGROUND ART

Due to an increase in the number of transport facilities, the amount of particles (particulate matter) discharged by non-exhaust pipes (non-exhaust systems) is increasing.

Recently, with strengthened regulations on particulate matter in exhaust systems, particulate matter generated in non-exhaust pipes (non-exhaust systems) have also become an issue. Sources of the particulate matter generated in non-exhaust systems include brake wear, tire wear, and the like. Due to friction between a brake pad and a rotor, fine dust and substances harmful to the human body are generated. Particulate matter generated due to wear of the brake pad has a very small particle size and thus may directly affect the human body and the environment. In particular, in urban areas, the amount of fine particles emitted from the brake system is increasing due to an increase in traffic volume.

Since transport facilities such as vehicles do not have an apparatus for recovering particulate matter generated due to wear of a brake pad, a tire, or the like, there is a problem in that air pollution occurs. Also, there is a need for development of a filter capable of collecting particulate matter generated in non-exhaust systems, such as a brake pad and a tire, of transport facilities.

For a collection filter for collecting particulate matter generated in non-exhaust systems, such as a brake pad and a tire, of transport facilities, due to distinctiveness (temperature, moisture, vibration, etc.) of the environment related thereto, a new-concept filter material and technology are required.

In particular, since a collection filter for collecting particulate matter generated in a brake system should be installed near a brake pad that is expected to undergo a surface temperature increase of hundreds of degrees or more (700° C. at maximum) due to friction, it is required to secure heat resistance, and there is a need for development of a filter material having excellent durability against filter contamination due to roadside rainwater and dust and vibration due to traveling of a vehicle.

$NO_x$ and $SO_x$ can be removed by a catalyst or self-ignition, but particulate matter generated in non-exhaust systems has a composition that is difficult to oxidize. Thus, a material capable of effective collection of particulate matter should be developed, a part to which the material is applied should be developed, and differentiated technology capable of removing the collected particulate matter should be applied.

RELATED ART DOCUMENT

Patent Document

Korean Patent Publication No. 10-2017-0085015

DISCLOSURE

Technical Problem

The present invention is directed to providing a collection apparatus for collecting particulate matter generated due to friction between a rotor and a brake pad in a brake system of a transport facility.

Technical Solution

The present invention provides a collection apparatus for collecting particulate matter generated due to friction between a rotor and a brake pad in a brake system of a transport facility, the collection apparatus including a first collector configured to surround a portion of an outer side surface of the rotor, an upper collector configured to surround a portion of an outer peripheral surface of the rotor, and a second collector configured to surround a portion of an inner side surface of the rotor, wherein the first collector and the second collector are made of porous ceramic foam.

The collection apparatus may be provided to have a U-shaped exterior as a whole and configured to accommodate a portion of the rotor inside the U-shape.

The first collector may be disposed to face the outer side surface of the rotor, the second collector may be disposed to face the inner side surface of the rotor, the second collector may be disposed at the opposite side of the first collector with respect to the rotor which has a disc shape, and the first collector and the second collector may be disposed to face each other with respect to the rotor.

The collection apparatus may further include a first collector cover configured to cover and protect the first collector and suppress particulate matter entering the first collector from leaking to the outside and a second collector cover configured to cover and protect the second collector and suppress particulate matter entering the second collector from leaking to the outside.

An upper collector cover configured to protect the upper collector may be further provided on an upper portion of the upper collector.

Holes may be formed in the upper collector cover to allow clean air filtered by the upper collector to be discharged to the outside.

The porous ceramic foam may be made of one or more ceramic materials selected from the group consisting of alumina ($Al_2O_3$), cordierite ($2MgO \cdot 2Al_2O_3 \cdot 5SiO_2$), mullite ($3Al_2O_3 \cdot 2SiO_2$), and silicon carbide (SiC).

The porous ceramic foam may have a porosity in a range of 40% to 90%.

The porous ceramic foam may include pores (cells) that serve as a passage through which particulate matter enters and a wall body that forms a strut of the porous ceramic foam between the pores (cells), and a plurality of whiskers may protrude from a surface of the wall body toward the pores (cells).

The whisker may be made of one or more needle-shaped ceramic materials selected from the group consisting of mullite ($3Al_2O_3 \cdot 2SiO_2$), zinc oxide (ZnO), and silicon carbide (SiC).

The porous ceramic foam may include a first area in which relatively smaller pores are distributed as compared to a second area and the second area in which relatively larger pores are distributed as compared to the first area, and the first area may collect particulate matter of a smaller size than particulate matter collected by the second area.

The second area may be disposed to be more adjacent to the rotor than the first area.

The upper collector may be made of the porous ceramic foam.

The first collector and the second collector may be made of porous ceramic foam having a stepped portion that protrudes to cover a portion of the outer peripheral surface of the rotor.

The porous ceramic foam may be coated with a hydrophobic coating film and show hydrophobicity.

The first collector and the second collector may include ribs arranged in a serpentine shape and a channel that constitutes an empty space between one rib and another rib.

The ribs may be formed in a curved shape.

In the first collector and the second collector, a rib block may be disposed at an end portion of the rib, the rib block may be a medium configured to connect one rib to another rib, the particulate matter generated due to friction between the rotor and the brake pad may enter through an inlet of the channel, an empty space between the inlet of the channel and the rib block may be an area constituting the channel in a Y-axis direction perpendicular to an X-axis which is an axis of rotation of the rotor, and an empty space between one rib and another rib may be an area constituting the channel in a Z-axis direction perpendicular to the X-axis and Y-axis.

Advantageous Effects

According to the present invention, particulate matter generated due to friction between a rotor and a brake pad in a brake system of a transport facility can be efficiently collected. By reducing the amount of particulate matter generated when braking a transport facility, air pollution can be prevented.

MODES OF THE INVENTION

Figure 1:
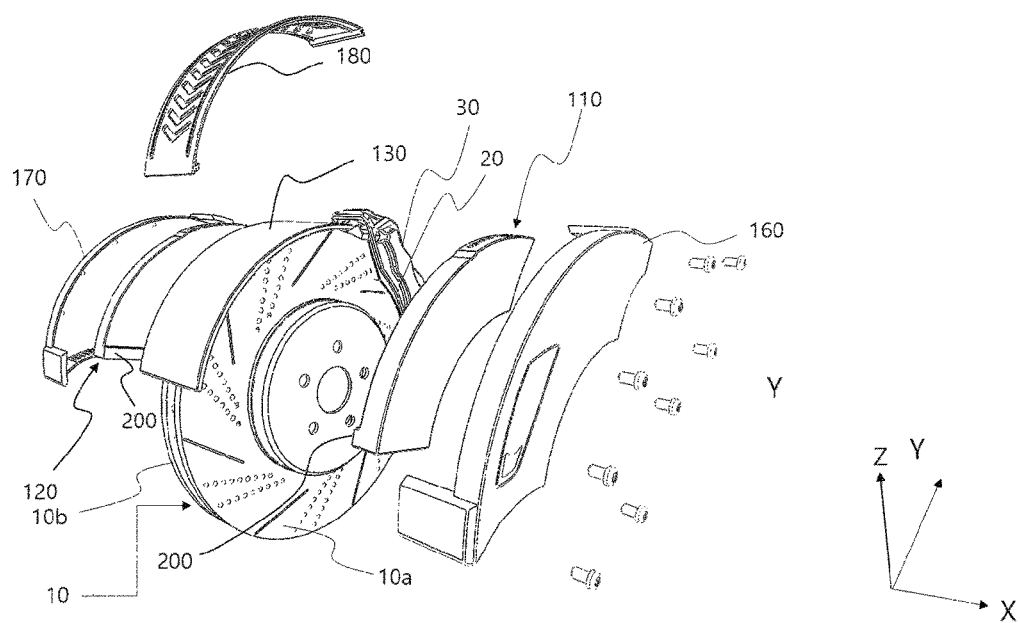
FIG. 1 and FIG. 2 are views illustrating an example of a collection apparatus for collecting particulate matter generated in a brake system of a transport facility.

Hereinafter, exemplary embodiments according to the present invention will be described in detail with reference to the accompanying drawings. However, the embodiments described herein are only provided to allow those of ordinary skill in the art to sufficiently understand the present invention and may be modified to various other forms. The scope of the present invention is not limited by the embodiments described herein.

When any one component is described as "including" another component in the detailed description or claims of the invention, unless otherwise stated, the any one component should not be construed in a limited sense as only including the other component and should be understood as having the possibility of further including other elements.

Hereinafter, the term "transport facility" is used to not only refer to automobiles, trucks, buses, and railroad vehicles, but also refer to two-wheeled vehicles such as motorcycles. Also, in porous ceramic foam, the term "pores" is used to not only refer to pores that form cells between one wall body and another wall body, but also refer to pores formed in the wall bodies.

A collection apparatus according to an exemplary embodiment of the present invention, which is an apparatus for collecting particulate matter generated due to friction between a rotor and a brake pad in a brake system of a transport facility, includes a first collector configured to surround a portion of an outer side surface of the rotor, an upper collector configured to surround a portion of an outer peripheral surface of the rotor, and a second collector configured to surround a portion of an inner side surface of the rotor, wherein the first collector and the second collector are made of porous ceramic foam.

The collection apparatus may be provided to have a U-shaped exterior as a whole and configured to accommodate a portion of the rotor inside the U-shape.

The first collector may be disposed to face the outer side surface of the rotor, the second collector may be disposed to face the inner side surface of the rotor, the second collector may be disposed at the opposite side of the first collector with respect to the rotor which has a disc shape, and the first collector and the second collector may be disposed to face each other with respect to the rotor.

The collection apparatus may further include a first collector cover configured to cover and protect the first collector and suppress particulate matter entering the first collector from leaking to the outside and a second collector cover configured to cover and protect the second collector and suppress particulate matter entering the second collector from leaking to the outside.

An upper collector cover configured to protect the upper collector may be further provided on an upper portion of the upper collector.

Holes may be formed in the upper collector cover to allow clean air filtered by the upper collector to be discharged to the outside.

The porous ceramic foam may be made of one or more ceramic materials selected from the group consisting of alumina ($Al_2O_3$), cordierite ($2MgO. 2Al_2O_3. 5SiO_2$), mullite ($3Al_2O_3. 2SiO_2$), and silicon carbide (SiC).

The porous ceramic foam may have a porosity in a range of 40% to 90%.

The porous ceramic foam may include pores (cells) that serve as a passage through which particulate matter enters and a wall body that forms a strut of the porous ceramic foam between the pores (cells), and a plurality of whiskers may protrude from a surface of the wall body toward the pores (cells).

The whisker may be made of one or more needle-shaped ceramic materials selected from the group consisting of mullite ($3Al_2O_3. 2SiO_2$), zinc oxide (ZnO), and silicon carbide (SiC).

The porous ceramic foam may include a first area in which relatively smaller pores are distributed as compared to a second area and the second area in which relatively larger pores are distributed as compared to the first area, and the first area may collect particulate matter of a smaller size than particulate matter collected by the second area.

The second area may be disposed to be more adjacent to the rotor than the first area.

The upper collector may be made of porous ceramic foam.

The first collector and the second collector may be made of porous ceramic foam having a stepped portion that protrudes to cover a portion of the outer peripheral surface of the rotor.

The porous ceramic foam may be coated with a hydrophobic coating film and show hydrophobicity.

The first collector and the second collector may include ribs arranged in a serpentine shape and a channel that constitutes an empty space between the ribs.

The ribs may be formed in a curved shape.

In the first collector and the second collector, a rib block may be disposed at an end portion of the rib, the rib block may be a medium configured to connect one rib to another rib, the particulate matter generated due to friction between the rotor and the brake pad may enter through an inlet of the channel, an empty space between the inlet of the channel and the rib block may be an area constituting the channel in a Y-axis direction perpendicular to an X-axis which is an axis of rotation of the rotor, and an empty space between one rib and another rib may be an area constituting the channel in a Z-axis direction perpendicular to the X-axis and Y-axis.

Hereinafter, the collection apparatus for collecting particulate matter generated in a brake system of a transport facility will be described in more detail.

First Embodiment

Figure 2:
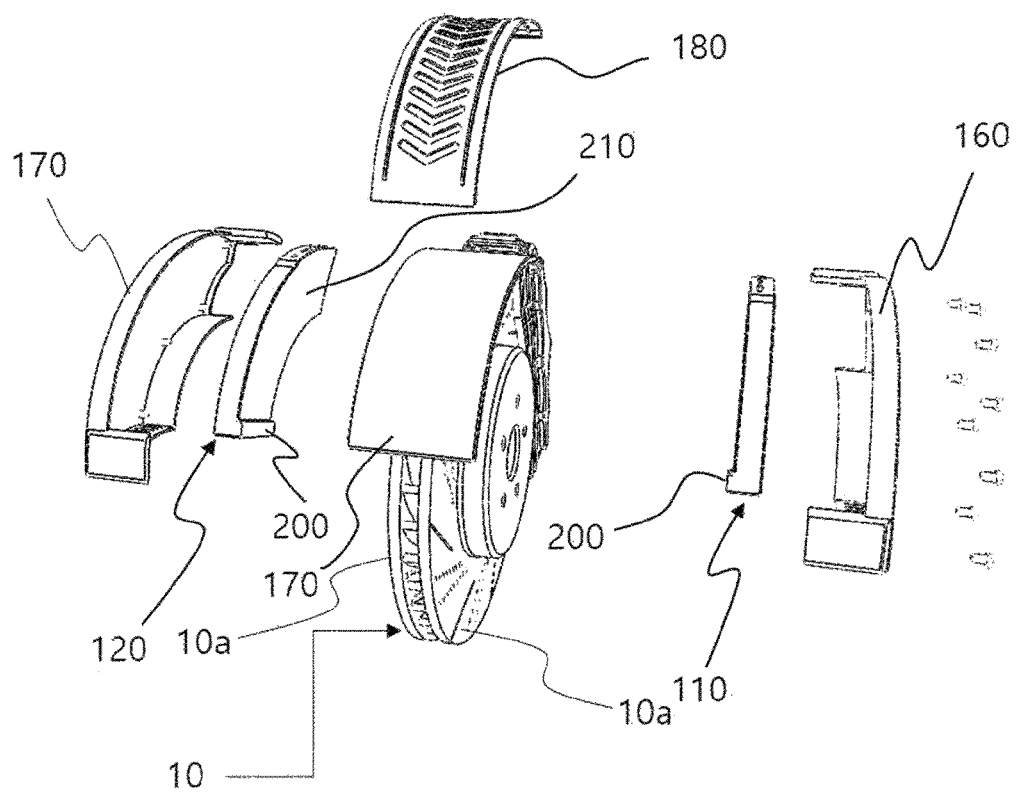
Figure 3:
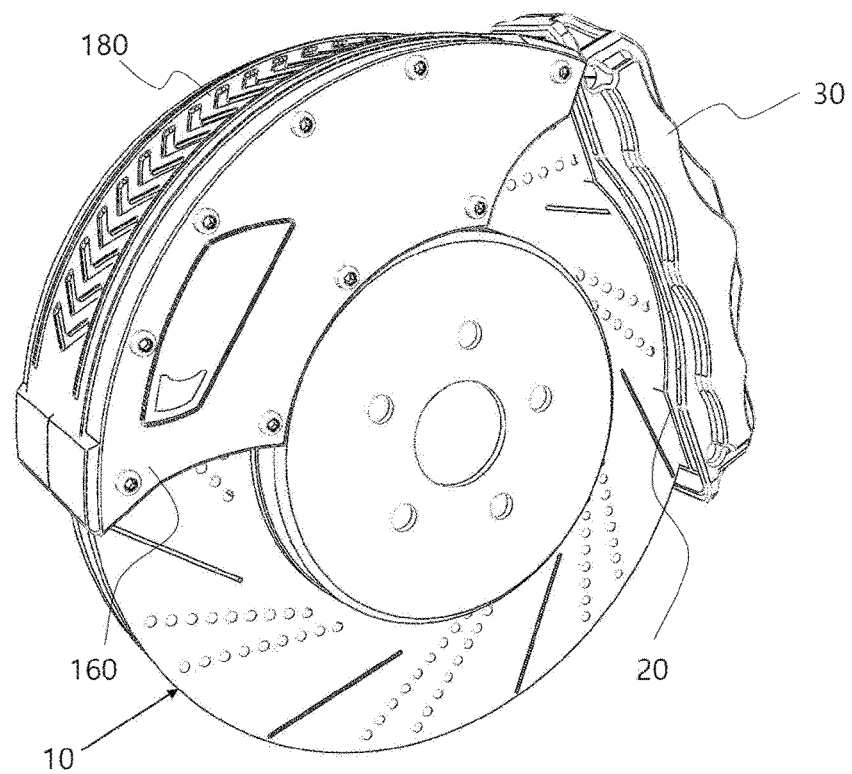
FIG. 3 is a view showing an example of a state in which the collection apparatus is coupled to the brake system.
Figure 4:
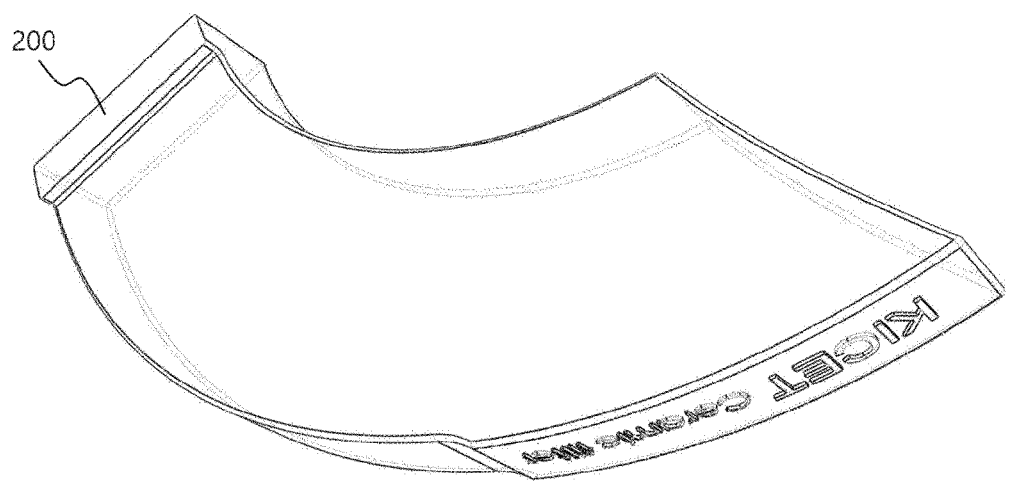
FIG. 4 is a view schematically illustrating an example of porous ceramic foam.

FIGS. 1 and 2 are views illustrating an example of a collection apparatus for collecting particulate matter generated in a brake system of a transport facility. FIG. 3 is a view showing an example of a state in which the collection apparatus is coupled to the brake system. FIG. 4 is a view schematically illustrating an example of porous ceramic foam.

Referring to FIGS. 1 to 4, the brake system is a system that performs braking by friction that occurs between a brake pad 20 and a rotor 10. The brake system includes the rotor 10 which is disc-shaped and connected to an axle to rotate, the brake pad 20 configured to apply pressure to the rotor 10 in an axial direction (X-axis direction) (a direction perpendicular to a plane on which the disc shape is formed) to brake rotation of the rotor 10, and a brake caliper 30 configured to bring the brake pad 20 into close contact with the rotor 10 or separate the brake pad 20, which is in contact with the rotor 10, from the rotor 10 to control the rotation of the rotor 10.

The rotor 10 is a disc-shaped device connected to an axle to rotate. The rotor 10 may include a first disc surface 10a which is perpendicular to the X-axis and a second disc surface 10b which is parallel to the first disc surface. The first disc surface 10a and the second disc surface 10b may be coupled to each other by a rim or the like.

The brake pad 20 is a device for applying pressure to the rotor 10 in the axial direction (X-axis direction) (the direction perpendicular to the plane on which the disc shape is formed) to brake the rotation of the rotor 10. The brake pad 20 may include a first pad (not illustrated) configured to apply pressure to the first disc surface 10a and a second pad (not illustrated) configured to apply pressure to the second disc surface 10b. The brake pad 20 is mounted on the brake caliper 30 so as to be movable in the axial direction (X-axis direction).

The brake caliper 30 is a device for bringing the brake pad 20 into close contact with the rotor 10 or separating the brake pad 20, which is in contact with the rotor 10, from the rotor 10 to control the rotation of the rotor 10. The brake pad 20 may be accommodated inside the brake caliper 30 and may include a first pad (not illustrated) provided to face the rotor 10 while facing the first disc surface 10a and a second pad (not illustrated) provided to face the rotor 10 while facing the second disc surface 10b. The brake caliper 30 may be provided to have a U-shaped exterior as a whole to surround a portion of the rotor 10.

Particulate matter that is harmful to the human body is generated due to friction between the brake pad 20 and the rotor 10. In particular, particulate matter generated due to wear of the brake pad 20 has a very small particle size and thus may directly affect the human body and the environment. In particular, in urban areas, the amount of fine particles emitted from the brake system is increasing due to an increase in traffic volume.

Since the collection apparatus for collecting particulate matter generated in a brake system of a transport facility should be installed near the brake pad 20 that is expected to undergo a surface temperature increase of hundreds of degrees or more due to friction, it is required to secure heat resistance, and there is a need for development of a filter material having excellent durability against apparatus contamination due to roadside rainwater and dust and vibration due to traveling of the vehicle.

$NO_x$ and $SO_x$ can be removed by a catalyst or self-ignition, but particulate matter generated in the brake system has a composition that is difficult to oxidize. Thus, a material capable of effective collection of particulate matter should be developed, a part to which the material is applied should be developed, and differentiated technology capable of removing the collected particulate matter should be applied.

The collection apparatus according to an exemplary embodiment of the present invention is an apparatus for collecting particulate matter (dust) generated due to friction between the brake pad 20 and the rotor 10. The collection apparatus suctions and collects particulate matter (dust) that is generated when the brake pad 20 or the rotor 10 is worn as the rotor 10 and the brake pad 20 come into contact with each other at the time of braking during traveling of the vehicle. The collection apparatus according to an exemplary embodiment of the present invention may be provided to be replaceable. The collection apparatus according to an exemplary embodiment of the present invention may be replaced after being used for a certain amount of time or may be reusable after removing particulate matter therefrom.

In order to suction particulate matter generated due to friction between the brake pad 20 and the rotor 10, the shape, installation position, or the like of the collection apparatus may be changed according to the positions of the brake pad 20 and the brake caliper 30.

The collection apparatus may be installed behind the brake pad 20 when viewed in a forward traveling direction of a transport facility (installed behind the brake pad when viewed in a direction of rotation of the rotor). Installing the collection apparatus behind the brake pad 20 is advantageous for the particulate matter (dust), which is generated due to friction between the brake pad 20 and the rotor 10, to enter the collection apparatus due to wind or the like and allows a larger amount of particulate matter to be collected when the transport facility travels forward. When the transport facility travels forward, most of the particulate matter (dust) generated due to friction between the brake pad 20 and the rotor 10 may move rearward due to wind or the like and enter the collection apparatus installed behind the brake pad 20, thus being collected. The collection apparatus may be provided to collect particulate matter even without power.

Particulate matter (dust) may be naturally and efficiently suctioned into the collection apparatus due to a direction of air flowing while the vehicle travels (air flow).

The collection apparatus may be provided in a form that surrounds a portion of the rotor 10. The collection apparatus may be provided to have a U-shaped exterior as a whole to surround a portion of the rotor 10. The collection apparatus is configured so that a portion of the rotor 10 is accommodated inside the U-shape.

The collection apparatus may include a first collector 110 configured to surround a portion of an outer side surface (the first disc surface 10*a*) of the rotor 10, an upper collector 130 configured to surround a portion of an outer peripheral surface of the rotor 10, and a second collector 120 configured to surround a portion of an inner side surface (the second disc surface 10*b*) of the rotor 10. The first collector 110 is disposed to face the outer side surface (the first disc surface 10*a*) of the rotor 10. The second collector 120 is disposed to face the inner side surface (the second disc surface 10*b*) of the rotor 10. The second collector 120 is installed to be disposed at the opposite side of the first collector 110 with respect to the rotor 10 which has a disc shape. The first collector 110 and the second collector 120 are disposed to face each other with respect to the rotor 10. The first collector 110 and the second collector 120 are disposed to be spaced apart from the rotor 10.

The upper collector 130 is disposed to surround a portion of the outer peripheral surface of the rotor 10. The upper collector 130 may be connected to the first collector 110 and the second collector 120. The upper collector 130 may also be installed to be spaced apart from the rotor 10.

The collection apparatus may further include collector covers 160 and 170 configured to protect the first collector 110 and the second collector 120 and suppress particulate matter entering a channel from leaking to the outside. The collector covers 160 and 170 may be made of a lightweight synthetic resin having good machinability, e.g., a thermosetting synthetic resin, but may also be made of a material such as a metal or a metal alloy that has good durability and can withstand an impact. The collector covers may include a first collector cover 160 configured to cover and protect the first collector 110 and suppress particulate matter entering the channel from leaking to the outside and a second collector cover 170 configured to cover and protect the second collector 120 and suppress particulate matter entering the channel from leaking to the outside. The first collector cover 160 is disposed at the opposite side of the rotor 10 with respect to the first collector 110, and the second collector cover 170 is disposed at the opposite side of the rotor 10 with respect to the second collector 120. The collector covers 160 and 170 may also serve to prevent foreign substances such as dust from entering the rotor 10.

The first collector cover 160 may be configured in a form that completely covers a side surface of the first collector 110 and may be configured to come in close contact with the side surface of the first collector 110. The second collector cover 170 may be configured in a form that completely covers a side surface of the second collector 120 and may be configured to come in close contact with the side surface of the second collector 120.

Holes may be formed in the first collector cover 160 to allow clean air filtered by the first collector 110 to be discharged to the outside. The particulate matter generated due to friction between the rotor 10 and the brake pad 20 is collected by the first collector 110, and clean air that has passed through the first collector 110 is discharged through the holes of the first collector cover 160. In this way, a temperature increase around the rotor 10 may be suppressed. Holes may also be formed in the second collector cover 170 to allow clean air filtered by the second collector 120 to be discharged to the outside. The particulate matter generated due to friction between the rotor 10 and the brake pad 20 is collected by the second collector 120, and clean air that has passed through the second collector 120 is discharged through the holes of the second collector cover 170. In this way, a temperature increase around the rotor 10 may be suppressed.

The collection apparatus may further include an upper collector cover 180 configured to protect the upper collector 130. The upper collector cover 180 may be made of a lightweight synthetic resin having good machinability, e.g., a thermosetting synthetic resin, but may also be made of a material such as a metal or a metal alloy that has good durability and can withstand an impact. The upper collector cover 180 may be disposed on an upper portion of the upper collector 130. The upper collector cover 180 may be disposed on the outer peripheral surface of the rotor 10 and also serve to prevent foreign substances such as dust from entering the rotor 10. Holes may be formed in the upper collector cover 180 to allow clean air filtered by the upper collector 130 to be discharged to the outside. The particulate matter generated due to friction between the rotor 10 and the brake pad 20 is collected by the upper collector 130, and clean air that has passed through the upper collector 130 is discharged through the holes of the upper collector cover 180. In this way, a temperature increase around the rotor 10 may be suppressed.

The first collector 110 and the second collector 120 may be formed in a linear shape from one end to the other end or, preferably, may be formed in a curved shape from one end to the other end (refer to "210" in FIG. 2). More preferably, the first collector 110 and the second collector 120 may be formed in a curved shape that has the same curvature as the disc of the disc-shaped rotor 10. The curvature of the first collector 110 and the second collector 120 which are formed in a curved shape may be the same as the curvature of the disc of the disc-shaped rotor 10.

The particulate matter (dust) generated due to friction between the brake pad 20 and the rotor 10 enters the first collector 110 and the second collector 120. The first collector 110 and the second collector 120 are made of porous ceramic foam. Since the first collector 110 and the second collector 120 are installed near the rotor 10 that is expected to undergo a surface temperature increase of hundreds of degrees or more due to friction between the rotor 10 and the brake pad 20, it is required to secure heat resistance, and durability is required to withstand contamination due to rainwater or dust and vibration due to traveling of the vehicle. In consideration of such aspects, the first collector 110 and the second collector 120 may be made of heat-resistant porous ceramic foam (ceramic porous body) such as alumina ($Al_2O_3$), cordierite ($2MgO \cdot 2Al_2O_3 \cdot 5SiO_2$), mullite ($3Al_2O_3 \cdot 2SiO_2$), silicon carbide (SiC), or a mixture thereof. The first collector 110 and the second collector 120 may be made of porous ceramic foam having a stepped portion 200 that protrudes to cover a portion of the outer peripheral surface of the rotor 10.

The porous ceramic foam is a porous body having numerous pores. The porous ceramic foam includes pores (cells) that serve as a passage through which particulate matter enters and a wall body that forms a strut of the porous ceramic foam between the pores (cells). Large pores between one wall body and another wall body in the porous ceramic foam are also referred to as cells, pores smaller than the cells are formed in the wall body, and the pores in the porous ceramic foam include the cells as well as the pores formed in the wall body.

The porous ceramic foam may have a porosity in a range of 40% to 90%, preferably, in a range of 60% to 85%. When the porosity is too low, particulate matter filtering efficiency may be low, and when the porosity is too high, cracks or the like may be easily formed or breakage may easily occur due to vibration, impact, or the like, and thus durability may be lowered. The size of the pores (cells) distributed in the porous ceramic foam may be in a range of about 50 μm to 2 mm, and the size of the pores formed in the wall body may be in a range of about 50 nm to 50 μm.

A hydrophobic coating film may be applied on the porous ceramic foam to suppress formation of water drops on a surface thereof. For the porous ceramic foam to have hydrophobicity, a porous ceramic material may be coated with a hydrophobic material to produce the porous ceramic foam. When the porous ceramic foam is hydrophilic, a large amount of water drops may be formed on the surface of the porous ceramic foam, and the filtering effect may be degraded. The hydrophobic coating film may have a thickness in a range of about 10 nm to 2 μm.

The hydrophobic coating film may be formed by coating an outer boundary surface of the porous ceramic foam with a paste, a suspension, or a colloid and heat-treating the porous ceramic foam at a temperature in a range of about 400° C. to 1,000° C. As an example of forming the hydrophobic coating film, a case of coating a boehmite-$TiO_2$ sol may be included.

The boehmite-$TiO_2$ sol may be produced as below.

Boehmite is added to a solvent such as distilled water and hydrolyzed at a temperature of about 60° C. Here, an acid such as nitric acid ($HNO_3$) is added to peptize the boehmite solution and form a boehmite sol.

A $TiO_2$ precursor is added to a solvent such as distilled water and hydrolyzed at a temperature of about 50° C. Here, an acid such as nitric acid ($HNO_3$) is added to peptize the $TiO_2$ precursor solution and form a $TiO_2$ sol. The $TiO_2$ precursor may be titanium isopropoxide (TTIP) or the like.

The boehmite sol and the $TiO_2$ sol are mixed to obtain the boehmite-$TiO_2$ sol.

The upper collector 130 may also be made of porous ceramic foam. The upper collector 130 may be made of heat-resistant porous ceramic foam such as alumina ($Al_2O_3$), cordierite ($2MgO \cdot 2Al_2O_3 \cdot 5SiO_2$), mullite ($3Al_2O_3 \cdot 2SiO_2$), silicon carbide (SiC), or a mixture thereof. The upper collector 130 may be disposed on the outer peripheral surface of the rotor 10 and also serve to prevent foreign substances such as dust from entering the rotor 10.

Hereinafter, a method of producing the porous ceramic foam will be described in detail. In order to produce the porous ceramic foam, porous polymer foam (e.g., polyurethane foam) is used as a substrate. The polymer foam is an elastic porous material like a sponge. The porosity, pore size, and the like of the polymer foam affect the porosity, pore size, and the like of the porous ceramic foam that is produced afterwards. The polymer foam is formed to correspond to the shape of porous ceramic foam to be produced and then is cleaned through ultrasonic cleaning or the like and dried. When the porous ceramic foam has the stepped portion 200 that protrudes to cover a portion of the outer peripheral surface of the rotor 10, the polymer foam is also formed in a shape that has a stepped portion. The drying may be performed in an oven at a temperature in a range of about 30° C. to 90° C., which is lower than a melting point of the polymer foam.

A starting material which includes a ceramic material, a binder, and a solvent is prepared. The ceramic material is the main material of the porous ceramic foam (ceramic porous body) to be produced. The ceramic material may be alumina ($Al_2O_3$) powder, cordierite ($2MgO \cdot 2Al_2O_3 \cdot 5SiO_2$) powder, mullite ($3Al_2O_3 \cdot 2SiO_2$) powder, silicon carbide (SiC) powder, or a mixed powder thereof. In consideration of the porosity, pore size, strength, and the like of the porous ceramic foam that is produced, powder having an average particle diameter in a range of 10 nm to 40 μm, preferably, in a range of 100 nm to 30 μm, may be used as the ceramic material.

The starting material may further include glass frit. The glass frit may be contained in an amount of 0.01 to 45 parts by weight, preferably, in an amount of 0.1 to 40 parts by weight, based on 100 parts by weight of the ceramic material in the starting material. The glass frit may not only serve to lower a sintering temperature and allow the porous ceramic foam itself to contain Si, but also serve to improve whisker growth.

The solvent may be distilled water or the like.

Polyvinyl alcohol (PVA), polyethylene glycol (PEG), or the like may be used as the binder. The binder serves to improve adhesion of a ceramic slurry. The binder may be contained in an amount of 1 to 50 parts by weight based on 100 parts by weight of the ceramic material in the starting material.

The starting material may further include a dispersant. A commercially available material may be used as the dispersant, and the use thereof is not particularly limited. The dispersant may be contained in an amount of 0.1 to 25 parts by weight based on 100 parts by weight of the ceramic material in the starting material.

The starting material is mixed to form the ceramic slurry.

The ceramic slurry is dip-coated on the polymer foam. The polymer foam may be completely dipped in the ceramic slurry, and dip coating may be performed in a vacuum atmosphere. After the dip coating, an external force may be applied to compress the polymer foam to remove excess slurry contained in the polymer foam and then the polymer foam may be decompressed to allow the polymer foam to be restored to its original shape. In this way, some of the slurry contained in the polymer foam may come out of the polymer foam.

The polymer foam on which the dip coating is performed is dried. The drying may be performed in an oven at a temperature in a range of about 30° C. to 90° C., which is lower than a melting point of the polymer foam.

The polymer foam on which the dip coating is performed is sintered. The polymer foam on which the dip coating is performed is charged into a furnace, the temperature in the furnace is raised to a first temperature (e.g., in a range of 400° C. to 800° C.) that is higher than a flash point of the polymer foam, the first temperature is maintained for a predetermined amount of time so that a polymer component is removed by burning, the temperature in the furnace is raised to a sintering temperature (e.g., in a range of 1,100° C. to 1,600° C.), and then the sintering temperature is maintained for a predetermined amount of time to perform sintering and obtain the porous ceramic foam. When alumina ($Al_2O_3$) powder, cordierite ($2MgO \cdot 2Al_2O_3 \cdot 5SiO_2$) powder, or mullite ($3Al_2O_3 \cdot 2SiO_2$) powder is used as the ceramic material, the sintering may be performed in an oxidizing atmosphere such as air and oxygen ($O_2$), and when silicon carbide (SiC) powder is used as the ceramic material, the sintering may be performed in a reducing atmosphere. The temperature in the furnace may be raised to the sintering temperature at a temperature increase rate in a range of 1° C./min to 50° C./min. This temperature increase rate is desirable because, when the temperature increase rate is too low, productivity may be reduced due to taking a long time, and when the temperature increase rate is too high, thermal stress may be applied due to a sharp temperature increase. After the sintering process is performed, the furnace temperature is lowered. The furnace may be cooled in a natural state by cutting off the power of the furnace, or a temperature decrease rate (e.g., 10° C./min) may be arbitrarily set to cool the furnace. The pressure inside the furnace may be constantly maintained even while the furnace temperature is being lowered. An organic component (or a polymer component) is removed by burning in the sintering process. Since sintering is performed at a temperature higher than a flash point of the organic component, the organic component is completely removed upon completion of the sintering process. A space in which the polymer was present constitutes pores, and a sintered body that has undergone the sintering process becomes porous.

The porous ceramic foam produced as above is a porous body having numerous pores. The porous ceramic foam includes pores (cells) that serve as a passage through which particulate matter enters and a wall body that forms a strut of the porous ceramic foam between the pores (cells).

A whisker may also be formed in the porous ceramic foam. More specifically, the porous ceramic foam may include pores (cells) that serve as a passage through which particulate matter enters and a wall body that forms a strut of the porous ceramic foam between the pores (cells), and a plurality of whiskers may protrude from a surface of the wall body toward the pores (cells).

Figure 5:
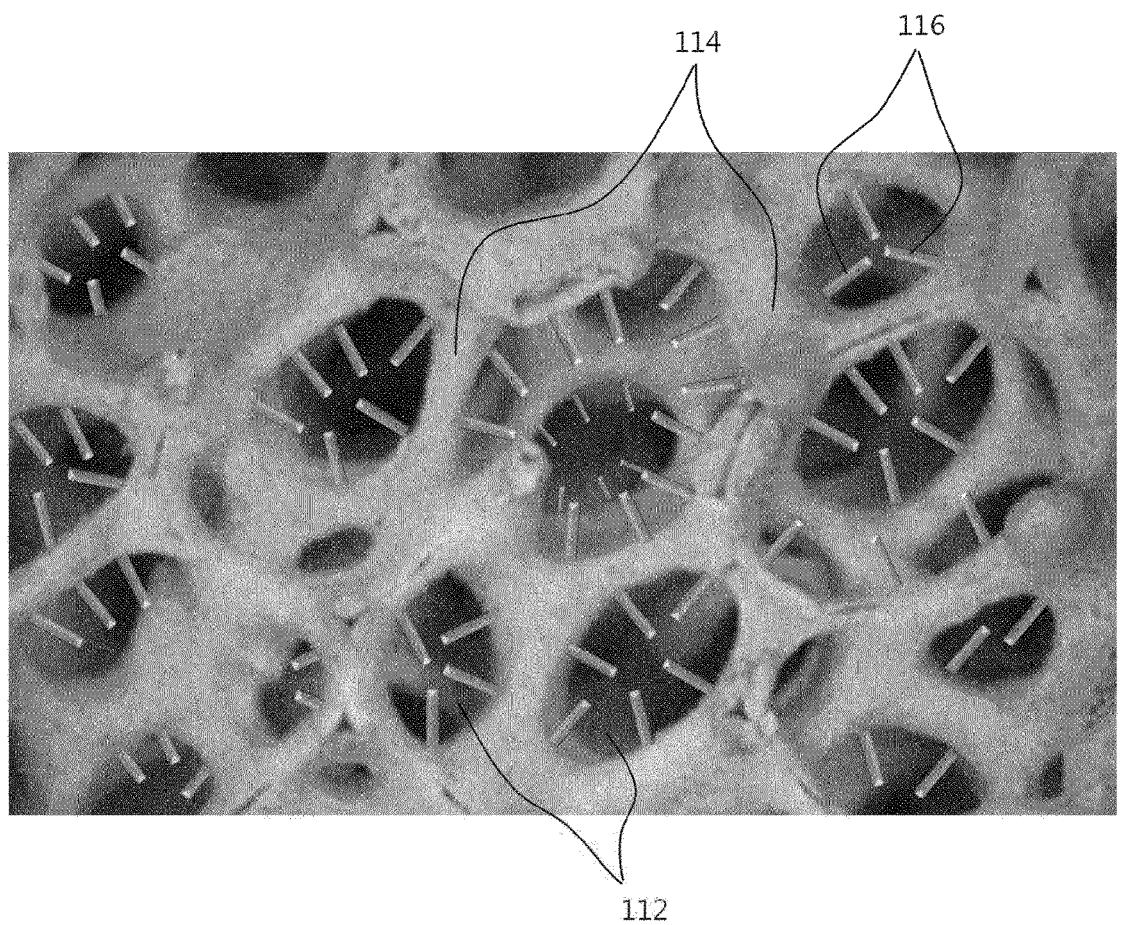
FIG. 5 is a view schematically illustrating an example of a structure in which whiskers protrude from a surface of a wall body.

The whisker may be made of one or more needle-shaped ceramic materials selected from the group consisting of mullite ($3Al_2O_3 \cdot 2SiO_2$), zinc oxide (ZnO), and silicon carbide (SiC). The whisker may be compared to the human nose hair, the pores may be compared to the nostrils, and the wall body may be compared to the nasal wall (the portion of the nose that surrounds the nostrils). Due to having nasal hair, the human nose can better filter dust or the like entering the nostrils. In consideration of this aspect, the inventors of the present invention have come up with the structure in which the whiskers protrude from the surface of the wall body. FIG. 5 is a view schematically illustrating an example of the structure in which the whiskers protrude from the surface of the wall body. Referring to FIG. 5, the porous ceramic foam includes pores (cells) 112 that serve as a passage through which particulate matter enters and a wall body 114 that forms a strut of the porous ceramic foam between the pores (cells), and a plurality of whiskers 116 protrude from a surface of the wall body 114 toward the pores (cells) 112. Accordingly, the particulate matter filtering effect can be maximized. The whiskers serve to effectively collect particulate matter while suppressing an increase in differential pressure during filtering.

Hereinafter, a method of producing the porous ceramic foam that includes the whiskers protruding from the surface of the wall body will be described.

First, a method of forming whiskers made of mullite ($3Al_2O_3 \cdot 2SiO_2$) material on a surface of the porous ceramic foam will be described.

A starting material which includes source materials of components constituting the whiskers, a binder, and a solvent is prepared.

The source materials serve to provide sources of components constituting the main material of the whiskers to be produced. As a source of Al, alumina, an Al metal salt such as aluminum tri-sec-butoxide, or the like may be used, and as a source of Si, a silica sol, tetraethyl orthosilicate (TEOS), glass, glass frit, fly ash, feldspar, kaolin, clay, kyanite, or the like may be used. The source materials may further include mullite powder, and the mullite powder may serve as a seed of mullite crystal growth. Also, the source materials may further include materials such as $AlF_3$ and $NH_4F$ that act as a source of F.

The solvent may be distilled water or the like.

Polyvinyl alcohol (PVA), polyethylene glycol (PEG), or the like may be used as the binder. The binder serves to improve adhesion of a ceramic slurry. The binder may be contained in an amount of 1 to 50 parts by weight based on 100 parts by weight of the source materials in the starting material.

The starting material may further include a dispersant. A commercially available material may be used as the dispersant, and the use thereof is not particularly limited. The dispersant may be contained in an amount of 0.1 to 25 parts by weight based on 100 parts by weight of the source materials in the starting material.

The starting material may further include a thickener. A commercially available material may be used as the thickener, and the use thereof is not particularly limited. The thickener serves to increase the viscosity of the ceramic slurry, which will be described below, to decrease a settling rate thereof. The thickener may be contained in an amount of 0.1 to 25 parts by weight based on 100 parts by weight of the source materials in the starting material.

The starting material is mixed to form the ceramic slurry.

The ceramic slurry is dip-coated on the porous ceramic foam. The porous ceramic foam may be completely dipped in the ceramic slurry, and dip coating may be performed in a vacuum atmosphere.

The porous ceramic foam on which the dip coating is performed is dried. The drying may be performed in an oven at a temperature in a range of about 30° C. to 90° C.

The porous ceramic foam on which the dip coating is performed is sintered. The porous ceramic foam on which the dip coating is performed is charged into a furnace, the temperature in the furnace is raised to a sintering temperature (e.g., in a range of 1,100° C. to 1,600° C.), and then the sintering temperature is maintained for a predetermined amount of time to obtain the porous ceramic foam on which the whiskers are formed. The sintering may be performed in an oxidizing atmosphere such as air and oxygen ($O_2$). The temperature in the furnace may be raised to the sintering temperature at a temperature increase rate in a range of 1° C./min to 50° C./min. This temperature increase rate is desirable because, when the temperature increase rate is too low, productivity may be reduced due to taking a long time, and when the temperature increase rate is too high, thermal stress may be applied due to a sharp temperature increase. After the sintering process is performed, the furnace temperature is lowered. The furnace may be cooled in a natural state by cutting off the power of the furnace, or a temperature decrease rate (e.g., 10° C./min) may be arbitrarily set to cool the furnace. The pressure inside the furnace may be constantly maintained even while the furnace temperature is being lowered. An organic component (or a polymer component) is removed by burning in the sintering process. Since sintering is performed at a temperature higher than a flash point of the organic component, the organic component is completely removed upon completion of the sintering process.

The porous ceramic foam produced as above is a porous body having numerous pores. The porous ceramic foam includes pores (cells) that serve as a passage through which particulate matter enters and a wall body that forms a strut of the porous ceramic foam between the pores (cells), and a plurality of mullite whiskers protrude from a surface of the wall body toward the pores (cells).

Hereinafter, a method of forming whiskers made of ZnO material on a surface of the porous ceramic foam will be described.

Source materials of components constituting the whiskers are mixed with a solvent to form a seed solution. The source materials serve to provide sources of components constituting ZnO, which is the main material of the whiskers to be produced. As the source materials, zinc nitrate hexahydrate ($Zn(NO_3)_2 \cdot 6H_2O$) or the like which serves as a source of Zn may be used. The solvent may be alcohol such as ethanol.

The seed solution is dip-coated on the porous ceramic foam. The porous ceramic foam may be completely dipped in the seed solution, and dip coating may be performed in a vacuum atmosphere.

The porous ceramic foam on which the dip coating is performed is annealed. The annealing may allow the seed solution to be well adhered to the porous ceramic foam. The annealing may be performed in an oven at a temperature in a range of about 120° C. to 300° C.

A starting material which includes source materials of components constituting the whiskers, a growth promoter, a binder, and a solvent is prepared.

The source materials serve to provide sources of components constituting ZnO, which is the main material of the whiskers to be produced. As the source materials, zinc nitrate hexahydrate ($Zn(NO_3)_2 \cdot 6H_2O$) or the like which serves as a source of Zn may be used.

Hexamethylenetetramine powder or the like may be used as the growth promoter. The growth promoter may be contained in an amount of 50 to 200 parts by weight based on 100 parts by weight of the source materials in the starting material.

Polyvinyl alcohol (PVA), polyethylene glycol (PEG), or the like may be used as the binder. The binder serves to improve adhesion of a ceramic slurry. The binder may be contained in an amount of 1 to 50 parts by weight based on 100 parts by weight of the source materials in the starting material.

The solvent may be an alcohol such as ethanol.

The starting material is mixed to form a growth solution.

The growth solution is dip-coated on the porous ceramic foam on which the annealing is performed. The porous ceramic foam may be completely dipped in the growth solution, and dip coating may be performed in a vacuum atmosphere.

The porous ceramic foam on which dip coating is performed with the growth solution is sintered. The porous ceramic foam on which dip coating is performed with the growth solution is charged into a furnace, the temperature in the furnace is raised to a sintering temperature (e.g., in a range of 1,000° C. to 1,500° C.), and then the sintering temperature is maintained for a predetermined amount of time to perform sintering and obtain the porous ceramic foam in which the whiskers are formed. The sintering may be performed in an oxidizing atmosphere such as air and oxygen ($O_2$). The temperature in the furnace may be raised to the sintering temperature at a temperature increase rate in a range of 1° C./min to 50° C./min. This temperature increase rate is desirable because, when the temperature increase rate is too low, productivity may be reduced due to taking a long time, and when the temperature increase rate is too high, thermal stress may be applied due to a sharp temperature increase. After the sintering process is performed, the furnace temperature is lowered. The furnace may be cooled in a natural state by cutting off the power of the furnace, or a temperature decrease rate (e.g., 10° C./min) may be arbitrarily set to cool the furnace. The pressure inside the furnace may be constantly maintained even while the furnace temperature is being lowered. An organic component (or a polymer component) is removed by burning in the sintering process. Since sintering is performed at a temperature higher than a flash point of the organic component, the organic component is completely removed upon completion of the sintering process.

The porous ceramic foam produced as above is a porous body having numerous pores. The porous ceramic foam includes pores (cells) that serve as a passage through which particulate matter enters and a wall body that forms a strut of the porous ceramic foam between the pores (cells), and a plurality of ZnO whiskers protrude from a surface of the wall body toward the pores (cells).

Hereinafter, a method of forming whiskers made of SiC material on a surface of the porous ceramic foam will be described.

The porous ceramic foam is charged into a growth apparatus such as a tube furnace. Silica powder and carbon powder which will be used as whisker growth sources are prepared. The silica powder and carbon powder may have a weight ratio in a range of 1:1 to 1:2. The temperature in the growth apparatus is raised to a reaction temperature (e.g., in a range of 1,350° C. to 1,600° C.), and a carrier gas is used to make the silica powder and carbon powder enter the growth apparatus so that SiC whiskers grow on a surface of the porous ceramic foam.

The porous ceramic foam produced as above is a porous body having numerous pores. The porous ceramic foam includes pores (cells) that serve as a passage through which particulate matter enters and a wall body that forms a strut of the porous ceramic foam between the pores (cells), and a plurality of SiC whiskers protrude from a surface of the wall body toward the pores (cells).

The method of producing the porous ceramic foam and methods of forming the whiskers on the porous ceramic foam have been described above, but the method of producing the porous ceramic foam and methods of forming the whiskers may vary and are not limited to the examples described above.

The upper collector 130 may also be made of the porous ceramic foam described above but may also be made of a ceramic fiber filter in which ceramic fibers are entangled in a network form. In this case, pores distributed in the upper collector 130 may have an average size in a range of 50 nm to 10 μm. The ceramic fibers may be made of a heat-resistant ceramic material such as alumina ($Al_2O_3$), cordierite ($2MgO \cdot 2Al_2O_3 \cdot 5SiO_2$), mullite ($3Al_2O_3 \cdot 2SiO_2$), silicon carbide (SiC), or a mixture thereof.

The upper collector 130 made of the ceramic fiber material may be produced by methods such as electrospinning of ceramic fibers. For example, electrospinning of a solution including ceramic fibers may be performed under conditions including a voltage difference in a range of 1 kV to 100 kV, a spinning flow rate in a range of 0.1 ml/h to 10 ml/h, a spinning distance in a range of 2 cm to 50 cm, and a nozzle hole size in a range of 0.01 mm to 2.0 mm to produce the ceramic fiber filter in which ceramic fibers are entangled in a network form.

Second Embodiment

The configuration of the collection apparatus is the same as in the first embodiment, and only the porous ceramic foam constituting the first collector 110, the second collector 120, or the upper collector 130 is configured differently. Thus, description of the collection apparatus will be omitted. Hereinafter, only the porous ceramic foam which is different from that of the first embodiment will be described.

The first collector 110 and the second collector 120 are made of porous ceramic foam. The first collector 110 and the second collector 120 may be made of heat-resistant porous ceramic foam such as alumina ($Al_2O_3$), cordierite ($2MgO \cdot 2Al_2O_3 \cdot 5SiO_2$), mullite ($3Al_2O_3 \cdot 2SiO_2$), silicon carbide (SiC), or a mixture thereof. The first collector 110 and the second collector 120 may be made of porous ceramic foam having a stepped portion 200 that protrudes to cover a portion of the outer peripheral surface of the rotor 10.

The porous ceramic foam may have a porosity in a range of 40% to 90%, preferably, in a range of 60% to 85%. When the porosity is too low, the particulate matter filtering efficiency may be low, and when the porosity is too high, cracks or the like may be easily formed or breakage may easily occur due to vibration, impact, or the like, and thus durability may be lowered. The size of the pores (cells) distributed in the porous ceramic foam may be in a range of about 50 μm to 2 mm, and the size of the pores formed in the wall body may be in a range of about 50 nm to 50 μm.

The upper collector 130 may also be made of porous ceramic foam. The upper collector 130 may be made of heat-resistant porous ceramic foam such as alumina ($Al_2O_3$), cordierite ($2MgO \cdot 2Al_2O_3 \cdot 5SiO_2$), mullite ($3Al_2O_3 \cdot 2SiO_2$), silicon carbide (SiC), or a mixture thereof. The upper collector 130 may be disposed on the outer peripheral surface of the rotor 10 and also serve to prevent foreign substances such as dust from entering the rotor 10.

The porous ceramic foam is a porous body having numerous pores. The porous ceramic foam includes pores (cells) that serve as a passage through which particulate matter enters and a wall body that forms a strut of the porous ceramic foam between the pores (cells).

The porous ceramic foam includes a first area A in which relatively smaller pores are distributed as compared to a second area B and the second area B in which relatively larger pores are distributed as compared to the first area A.

Figure 6:
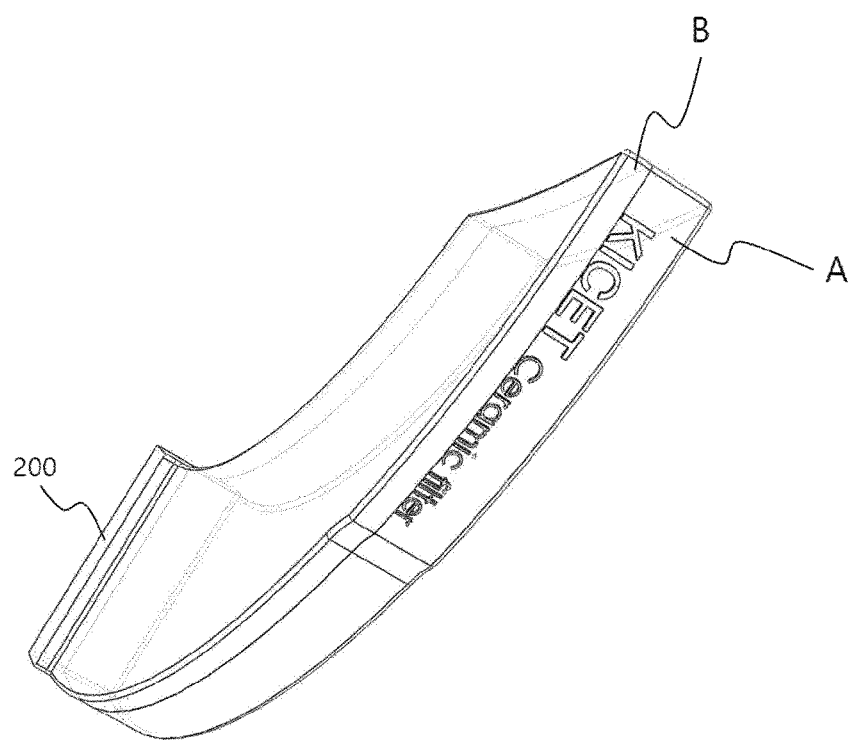
FIG. 6 is a view schematically illustrating another example of porous ceramic foam.
Figure 7:
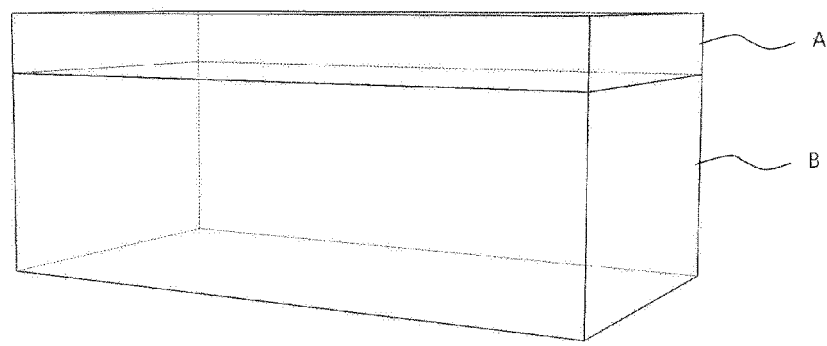
FIG. 7 is a view showing a cut portion of the porous ceramic foam, which is illustrated in FIG. 6, to more clearly show a first area A and a second area B.

FIG. 6 is a view schematically illustrating the porous ceramic foam including the first area A in which relatively smaller pores are distributed as compared to the second area B and the second area B in which relatively larger pores are distributed as compared to the first area A, and FIG. 7 is a view showing a cut portion of the porous ceramic foam, which is illustrated in FIG. 6, to more clearly show the first area A and the second area B.

Referring to FIGS. 6 and 7, the porous ceramic foam may include the first area A in which relatively smaller pores (pores having a first size) are distributed as compared to the second area B and the second area B in which relatively larger pores (pores having a second size) are distributed as compared to the first area A, and the first area A may collect particulate matter of a smaller size than particulate matter collected by the second area B. The pores having the second size may have a larger average pore diameter than the pores having the first size, and the second area B may be disposed to be more adjacent to the rotor than the first area A.

A hydrophobic coating film may be applied on the porous ceramic foam, which includes the first area A and the second area B, to suppress formation of water drops on a surface thereof. For the porous ceramic foam to have hydrophobicity, a porous ceramic material may be coated with a hydrophobic material to produce the porous ceramic foam. When the porous ceramic foam is hydrophilic, a large amount of water drops may be formed on the surface of the porous ceramic foam, and the filtering effect may be degraded. The hydrophobic coating film may have a thickness in a range of about 10 nm to 2 μm.

Hereinafter, a method of producing the porous ceramic foam including the first area A and the second area B will be described.

In order to produce the porous ceramic foam, porous polymer foam (e.g., polyurethane foam) is used as a substrate. The polymer foam is an elastic porous material like a sponge. The porosity, pore size, and the like of the polymer foam affect the porosity, pore size, and the like of the porous ceramic foam that is produced afterwards. The polymer foam is cut to correspond to the shape of porous ceramic foam to be produced and then is cleaned through ultrasonic cleaning or the like and dried. The drying may be performed in an oven at a temperature in a range of about 30° C. to 90° C., which is lower than a melting point of the polymer foam.

A starting material which includes a ceramic material, a binder, and a solvent is prepared.

The ceramic material is the main material of the porous ceramic foam (ceramic porous body) to be produced. The ceramic material may be alumina ($Al_2O_3$) powder, cordierite ($2MgO \cdot 2Al_2O_3 \cdot 5SiO_2$) powder, mullite ($3Al_2O_3 \cdot 2SiO_2$)

powder, silicon carbide (SiC) powder, or a mixed powder thereof. In consideration of the porosity, pore size, strength, and the like of the porous ceramic foam that is produced, powder having an average particle diameter in a range of 10 nm to 40 μm, preferably, in a range of 100 nm to 30 μm, may be used as the ceramic material.

The starting material may further include glass frit. The glass frit may be contained in an amount of 0.01 to 45 parts by weight, preferably, in an amount of 0.1 to 40 parts by weight, based on 100 parts by weight of the ceramic material in the starting material. The glass frit may not only serve to lower a sintering temperature and allow the porous ceramic foam itself to contain Si, but also serve to improve whisker growth.

The solvent may be distilled water or the like.

Polyvinyl alcohol (PVA), polyethylene glycol (PEG), or the like may be used as the binder. The binder serves to improve adhesion of a ceramic slurry. The binder may be contained in an amount of 1 to 50 parts by weight based on 100 parts by weight of the ceramic material in the starting material.

The starting material may further include a dispersant. A commercially available material may be used as the dispersant, and the use thereof is not particularly limited. The dispersant may be contained in an amount of 0.1 to 25 parts by weight based on 100 parts by weight of the ceramic material in the starting material.

The starting material is mixed to form the ceramic slurry.

The ceramic slurry is dip-coated on the polymer foam. The polymer foam may be completely dipped in the ceramic slurry, and dip coating may be performed in a vacuum atmosphere. After the dip coating, an external force may be applied to compress the polymer foam to remove excess slurry contained in the polymer foam and then the polymer foam may be decompressed to allow the polymer foam to be restored to its original shape. In this way, some of the slurry contained in the polymer foam may come out of the polymer foam.

The polymer foam on which the dip coating is performed is dried. The drying may be performed in an oven at a temperature in a range of about 30° C. to 90° C., which is lower than a melting point of the polymer foam.

The polymer foam on which the dip coating is performed is sintered. The polymer foam on which the dip coating is performed is charged into a furnace, the temperature in the furnace is raised to a first temperature (e.g., in a range of 400° C. to 800° C.) that is higher than a flash point of the polymer foam, the first temperature is maintained for a predetermined amount of time so that a polymer component is removed by burning, the temperature in the furnace is raised to a sintering temperature (e.g., in a range of 1,100° C. to 1,600° C.), the sintering temperature is maintained for a predetermined amount of time to perform sintering, and the furnace is cooled to obtain the porous ceramic foam. When alumina ($Al_2O_3$) powder, cordierite ($2MgO \cdot 2Al_2O_3 \cdot 5SiO_2$) powder, or mullite ($3Al_2O_3 \cdot 2SiO_2$) powder is used as the ceramic material, the sintering may be performed in an oxidizing atmosphere such as air and oxygen ($O_2$), and when silicon carbide (SiC) powder is used as the ceramic material, the sintering may be performed in a reducing atmosphere. The temperature in the furnace may be raised to the sintering temperature at a temperature increase rate in a range of 1° C./min to 50° C./min. This temperature increase rate is desirable because, when the temperature increase rate is too low, productivity may be reduced due to taking a long time, and when the temperature increase rate is too high, thermal stress may be applied due to a sharp temperature increase. After the sintering process is performed, the furnace temperature is lowered. The furnace may be cooled in a natural state by cutting off the power of the furnace, or a temperature decrease rate (e.g., 10° C./min) may be arbitrarily set to cool the furnace. The pressure inside the furnace may be constantly maintained even while the furnace temperature is being lowered. An organic component (or a polymer component) is removed by burning in the sintering process. Since sintering is performed at a temperature higher than a flash point of the organic component, the organic component is completely removed upon completion of the sintering process. A space in which the polymer was present constitutes pores, and a sintered body that has undergone the sintering process becomes porous.

The porous ceramic foam produced as above is a porous body having numerous pores. The porous ceramic foam includes pores (cells) that serve as a passage through which particulate matter enters and a wall body that forms a strut of the porous ceramic foam between the pores (cells), and pores having a size identical or similar to the size of pores in the second area B in which relatively larger pores are distributed as compared to the first area A (pores having the second size) are distributed in the porous ceramic foam.

In order to form the first area A in which relatively smaller pores (pores having the first size) are distributed as compared to the second area B, a starting material which includes a ceramic material, a binder, and a solvent is prepared. Powder made of the same material as the ceramic, which is the main component of the porous ceramic foam, may be used as the ceramic material. The ceramic material may be alumina ($Al_2O_3$) powder, cordierite ($2MgO \cdot 2Al_2O_3 \cdot 5SiO_2$) powder, mullite ($3Al_2O_3 \cdot 2SiO_2$) powder, silicon carbide (SiC) powder, or a mixed powder thereof. In consideration of the porosity, pore size, strength, and the like of the porous ceramic foam that is produced, powder having an average particle diameter in a range of 10 nm to 40 μm, preferably, in a range of 100 nm to 30 μm, may be used as the ceramic material.

The starting material may further include glass frit. The glass frit may be contained in an amount of 0.01 to 45 parts by weight, preferably, in an amount of 0.1 to 40 parts by weight, based on 100 parts by weight of the ceramic material in the starting material. The glass frit may not only serve to lower a sintering temperature and allow the porous ceramic foam itself to contain Si, but also serve to improve whisker growth.

The solvent may be distilled water or the like.

Polyvinyl alcohol (PVA), polyethylene glycol (PEG), or the like may be used as the binder. The binder serves to improve adhesion of a ceramic slurry. The binder may be contained in an amount of 1 to 50 parts by weight based on 100 parts by weight of the ceramic material in the starting material.

The starting material may further include a dispersant. A commercially available material may be used as the dispersant, and the use thereof is not particularly limited. The dispersant may be contained in an amount of 0.1 to 25 parts by weight based on 100 parts by weight of the ceramic material in the starting material.

The starting material is mixed to form the ceramic slurry.

The ceramic slurry is coated on the porous ceramic foam in which the pores having the second size are distributed. The coating is selectively performed by dipping only an end portion (surface portion) of the porous ceramic foam to be coated and then taking out the same instead of completely dipping the porous ceramic foam in the ceramic slurry. When the coating is performed in this way, only a selected portion to be coated may be coated instead of coating the entire porous ceramic foam, the slurry is coated only to a predetermined depth from the surface of the porous ceramic foam, and in the portion coated with the slurry, relatively smaller pores (pores having the first size) are distributed as compared to an uncoated portion. The portion not coated with the slurry becomes an area (the second area) of the porous ceramic foam that has relatively larger pores (pores having the second size) as compared to the first area A, and the portion coated with the slurry becomes an area (the first area) of the porous ceramic foam that has relatively smaller pores (pores having the first size) as compared to the second area B.

The porous ceramic foam on which the coating is selectively performed is dried. The drying may be performed in an oven at a temperature in a range of about 30° C. to 90° C.

The porous ceramic foam on which the coating is selectively performed is sintered. The porous ceramic foam on which the coating is selectively performed is charged into a furnace, the temperature in the furnace is raised to a first temperature (e.g., in a range of 400° C. to 800° C.) that is higher than a flash point of the polymer, the first temperature is maintained for a predetermined amount of time so that a polymer component is removed by burning, the temperature in the furnace is raised to a sintering temperature (e.g., in a range of 1,000° C. to 1,500° C.), and then the sintering temperature is maintained for a predetermined amount of time to perform sintering and obtain the porous ceramic foam in which the first area A and the second area B are formed. When alumina ($Al_2O_3$) powder, cordierite ($2MgO. 2Al_2O_3. 5SiO_2$) powder, or mullite ($3Al_2O_3. 2SiO_2$) powder is used as the ceramic material, the sintering may be performed in an oxidizing atmosphere such as air and oxygen ($O_2$), and when silicon carbide (SiC) powder is used as the ceramic material, the sintering may be performed in a reducing atmosphere. The temperature in the furnace may be raised to the sintering temperature at a temperature increase rate in a range of 1° C./min to 50° C./min. This temperature increase rate is desirable because, when the temperature increase rate is too low, productivity may be reduced due to taking a long time, and when the temperature increase rate is too high, thermal stress may be applied due to a sharp temperature increase. After the sintering process is performed, the furnace temperature is lowered. The furnace may be cooled in a natural state by cutting off the power of the furnace, or a temperature decrease rate (e.g., 10° C./min) may be arbitrarily set to cool the furnace. The pressure inside the furnace may be constantly maintained even while the furnace temperature is being lowered. An organic component (or a polymer component) is removed by burning in the sintering process. Since sintering is performed at a temperature higher than a flash point of the organic component, the organic component is completely removed upon completion of the sintering process.

The porous ceramic foam produced as above is a porous body having numerous pores. The porous ceramic foam includes pores (cells) that serve as a passage through which particulate matter enters and a wall body that forms a strut of the porous ceramic foam between the pores (cells). While relatively smaller pores (pores having the first size) as compared to the second area B are distributed in the first area A, relatively larger pores (pores having the second size) as compared to the first area A are distributed in the second area B.

The porous ceramic foam including the first area A and the second area B may also be produced using the following method. Hereinafter, another example of producing the porous ceramic foam including the first area A and the second area B will be described.

In order to produce the porous ceramic foam including the first area A and the second area B, two porous polymer foams (e.g., polyurethane foams) are used as substrates. As the two polymer foams (a first polymer foam and a second polymer foam), polymer foams having different pore sizes (pores per inch (PPI)) are used. For example, an average pore size of the first polymer foam is smaller than an average pore size of the second polymer foam. The first and second polymer foams are an elastic porous material like a sponge. The porosity, pore size, and the like of the polymer foams affect the porosity, pore size, and the like of the porous ceramic foam that is produced afterwards. The first and second polymer foams are cut to correspond to the size of samples to be produced and then are cleaned through ultrasonic cleaning or the like and dried. The drying may be performed in an oven at a temperature in a range of about 30° C. to 90° C., which is lower than a melting point of the polymer foams.

A starting material which includes a ceramic material, a binder, and a solvent is prepared.

The ceramic material is the main material of the porous ceramic foam (ceramic porous body) to be produced. The ceramic material may be alumina ($Al_2O_3$) powder, cordierite ($2MgO. 2Al_2O_3. 5SiO_2$) powder, mullite ($3Al_2O_3. 2SiO_2$) powder, silicon carbide (SiC) powder, or a mixed powder thereof. In consideration of the porosity, pore size, strength, and the like of the porous ceramic foam that is produced, powder having an average particle diameter in a range of 10 nm to 40 μm, preferably, in a range of 100 nm to 30 μm, may be used as the ceramic material.

The starting material may further include glass frit. The glass frit may be contained in an amount of 0.01 to 45 parts by weight, preferably, in an amount of 0.1 to 40 parts by weight, based on 100 parts by weight of the ceramic material in the starting material. The glass frit may not only serve to lower a sintering temperature and allow the porous ceramic foam itself to contain Si, but also serve to improve whisker growth.

The solvent may be distilled water or the like.

Polyvinyl alcohol (PVA), polyethylene glycol (PEG), or the like may be used as the binder. The binder serves to improve adhesion of a ceramic slurry. The binder may be contained in an amount of 1 to 50 parts by weight based on 100 parts by weight of the ceramic material in the starting material.

The starting material may further include a dispersant. A commercially available material may be used as the dispersant, and the use thereof is not particularly limited. The dispersant may be contained in an amount of 0.1 to 25 parts by weight based on 100 parts by weight of the ceramic material in the starting material.

The starting material is mixed to form the ceramic slurry.

The ceramic slurry is dip-coated on the first and second polymer foams. The first and second polymer foams may be completely dipped in the ceramic slurry, and dip coating may be performed in a vacuum atmosphere. After the dip coating, an external force may be applied to compress the first and second polymer foams to remove excess slurry contained in the first and second polymer foams and then the first and second polymer foams may be decompressed to allow the first and second polymer foams to be restored to their original shapes. In this way, some of the slurry contained in the first and second polymer foams may come out of the first and second polymer foams.

The first polymer foam on which the dip coating is performed and the second polymer foam on which the dip coating is performed are overlapped and dried in an overlapping state. The drying may be performed in an oven at a temperature in a range of about 30° C. to 90° C., which is lower than a melting point of the first and second polymer foams.

The product of overlapping and drying the first polymer foam and the second polymer foam is sintered. The product of overlapping and drying the first polymer foam and the second polymer foam is charged into a furnace, the temperature in the furnace is raised to a first temperature (e.g., in a range of 400° C. to 800° C.) that is higher than a flash point of the first and second polymer foams, the first temperature is maintained for a predetermined amount of time so that polymer components are removed by burning, the temperature in the furnace is raised to a sintering temperature (e.g., in a range of 1,100° C. to 1,600° C.), the sintering temperature is maintained for a predetermined amount of time to perform sintering, and the furnace is cooled to obtain the porous ceramic foam in which the first area A and the second area B are formed. When alumina ($Al_2O_3$) powder, cordierite ($2MgO. 2Al_2O_3. 5SiO_2$) powder, or mullite ($3Al_2O_3. 2SiO_2$) powder is used as the ceramic material, the sintering may be performed in an oxidizing atmosphere such as air and oxygen ($O_2$), and when silicon carbide (SiC) powder is used as the ceramic material, the sintering may be performed in a reducing atmosphere. The temperature in the furnace may be raised to the sintering temperature at a temperature increase rate in a range of 1° C./min to 50° C./min. This temperature increase rate is desirable because, when the temperature increase rate is too low, productivity may be reduced due to taking a long time, and when the temperature increase rate is too high, thermal stress may be applied due to a sharp temperature increase. After the sintering process is performed, the furnace temperature is lowered. The furnace may be cooled in a natural state by cutting off the power of the furnace, or a temperature decrease rate (e.g., 10° C./min) may be arbitrarily set to cool the furnace. The pressure inside the furnace may be constantly maintained even while the furnace temperature is being lowered. Organic components (or polymer components) are removed by burning in the sintering process. Since sintering is performed at a temperature higher than a flash point of the organic components, the organic components are completely removed upon completion of the sintering process. A space in which the polymers were present constitutes pores, and a sintered body that has undergone the sintering process becomes porous.

When the first polymer foam and the second polymer foam which are coated with the ceramic slurry are overlapped and sintered, a porous ceramic foam that consists of a single body is formed. Polymer foams having different pore sizes (pores per inch (PPI)) are used as the first polymer foam and the second polymer foam, and thus an area where the first polymer foam was present and an area where the second polymer foam was present have different pore sizes. Accordingly, it is possible to obtain the porous ceramic foam in which an area (the first area) having relatively smaller pores (pores having the first size) as compared to the second area and an area (the second area) having relatively larger pores (pores having the second size) as compared to the first area are separate from each other.

The porous ceramic foam produced as above is a porous body having numerous pores. The porous ceramic foam includes pores (cells) that serve as a passage through which particulate matter enters and a wall body that forms a strut of the porous ceramic foam between the pores (cells). While relatively smaller pores (pores having the first size) as compared to the second area B are distributed in the first area A, relatively larger pores (pores having the second size) as compared to the first area A are distributed in the second area B.

A whisker may also be formed in the porous ceramic foam in which the area (first area) having relatively smaller pores (pores having the first size) as compared to the second area and the area (second area) having relatively larger pores (pores having the second size) as compared to the first area are separate from each other. More specifically, the first area A of the porous ceramic foam may include pores (cells) that serve as a passage through which particulate matter enters and a wall body that forms a strut of the porous ceramic foam between the pores (cells), a plurality of whiskers may protrude from a surface of the wall body toward the pores (cells), the second area B of the porous ceramic foam may also include pores (cells) that serve as a passage through which particulate matter enters and a wall body that forms a strut of the porous ceramic foam between the pores (cells), a plurality of whiskers may protrude from a surface of the wall body toward the pores (cells), and the pores formed and distributed in the first area A of the porous ceramic foam have a relatively smaller size than the pores formed and distributed in the second area B of the porous ceramic foam.

The whisker may be made of one or more needle-shaped ceramic materials selected from the group consisting of mullite ($3Al_2O_3. 2SiO_2$), zinc oxide (ZnO), and silicon carbide (SiC). A plurality of whiskers protrude from a surface of the wall body toward the pores (cells). Accordingly, the particulate matter filtering effect can be maximized. The whiskers serve to effectively collect particulate matter while suppressing an increase in differential pressure during filtering.

Since a method of forming the whiskers on a surface of the porous ceramic foam is the same as the method described above in the first embodiment, detailed description thereof will be omitted.

Third Embodiment

The configuration of the collection apparatus is the same as in the first embodiment, and only the porous ceramic foam constituting the first collector 110 and the second collector 120 is configured differently. Thus, description of the collection apparatus will be omitted. Hereinafter, only the porous ceramic foam which is different from that of the first embodiment will be described.

The first collector 110 and the second collector 120 are made of porous ceramic foam. The first collector 110 and the second collector 120 may be made of heat-resistant porous ceramic foam such as alumina ($Al_2O_3$), cordierite ($2MgO. 2Al_2O_3. 5SiO_2$), mullite ($3Al_2O_3. 2SiO_2$), silicon carbide (SiC), or a mixture thereof.

The porous ceramic foam may have a porosity in a range of 40% to 90%, preferably, in a range of 60% to 85%. When the porosity is too low, the particulate matter filtering efficiency may be low, and when the porosity is too high, cracks or the like may be easily formed or breakage may easily occur due to vibration, impact, or the like, and thus durability may be lowered. The size of the pores (cells) distributed in the porous ceramic foam may be in a range of about 50 μm to 2 mm, and the size of the pores formed in the wall body may be in a range of about 50 nm to 50 μm.

The porous ceramic foam is a porous body having numerous pores. The porous ceramic foam includes pores (cells)

that serve as a passage through which particulate matter enters and a wall body that forms a strut of the porous ceramic foam between the pores (cells).

The porous ceramic foam applied to the first collector 110 and the second collector 120 includes ribs 140 arranged in a serpentine shape and a channel 150 that constitutes an empty space between one rib and another rib.

Rather than being arranged in a straight line, the ribs 140 are arranged in a zigzag manner as illustrated in FIGS. 8 to 11. The ribs 140 are arranged in a serpentine shape.

The ribs 140 may be formed in a linear shape from one end to the other end or, preferably, may be formed in a curved shape from one end to the other end. More preferably, the ribs 140 may be formed in a curved shape that has the same curvature as the disc of the disc-shaped rotor 10. The curvature of the ribs which are formed in a curved shape may be the same as the curvature of the disc of the disc-shaped rotor 10. A separation distance between one rib and another rib may be the same throughout the ribs, but the present invention is not limited thereto.

The particulate matter (dust) generated due to friction between the brake pad 20 and the rotor 10 enters the channel 150 through an inlet 155. The channel 150 is an empty space between one rib and another rib and provides a path through which particulate matter enters. The channel 150 has a form that is open through the inlet 155, through which particulate matter enters, and is blocked by a rib block 145 configured to connect one rib and another rib. An empty space between the inlet 155 and the rib block 145 is an area constituting the channel in the Y-axis direction (a direction which is parallel to the outer side surface or inner side surface of the rotor and is perpendicular to the X-axis), and an empty space between one rib and another rib is an area constituting the channel in the Z-axis direction (which is a direction perpendicular to the X-axis and Y-axis). The inlet 155 faces the brake pad 20.

FIGS. 8 to 11 show an example of porous ceramic foam which includes eight ribs (a first rib, a second rib, a third rib, a fourth rib, a fifth rib, a sixth rib, a seventh rib, and an eighth rib).

Referring to FIGS. 8 to 11, a first rib 140*a* and a second rib 140*b* are connected at one ends thereof, the second rib 140*b* and a third rib 140*c* are connected at the other ends thereof, the third rib 140*c* and a fourth rib 140*d* are connected at one ends thereof, the fourth rib 140*d* and a fifth rib 140*e* are connected at the other ends thereof, the fifth rib 140*e* and a sixth rib 140*f* are connected at one ends thereof, the sixth rib 140*f* and a seventh rib 140*g* are connected at the other ends thereof, and the seventh rib 140*g* and an eighth rib 140*h* are connected at the one ends thereof. A separation distance between the first rib 140*a* and the second rib 140*b*, a separation distance between the second rib 140*b* and the third rib 140*c*, a separation distance between the third rib 140*c* and the fourth rib 140*d*, a separation distance between the fourth rib 140*d* and the fifth rib 140*e*, a separation distance between the fifth rib 140*e* and the sixth rib 140*f*, a separation distance between the sixth rib 140*f* and the seventh rib 140*g*, and a separation distance between the seventh rib 140*g* and the eighth rib 140*h* are configured to be the same. The ribs 140 may have the same (constant) thickness.

The rib block 145 is disposed at an end portion of the rib 140. The rib block 145 is a medium configured to connect one rib 140 to another rib 140. For example, the one end of the first rib 140*a* and the one end of the second rib 140*b* are connected by a first rib block 145*a*, the other end of the second rib 140*b* and the other end of the third rib 140*c* are connected by a second rib block 145*b*, the one end of the third rib 140*c* and the one end of the fourth rib 140*d* are connected by a third rib block 145*c*, the other end of the fourth rib 140*d* and the other end of the fifth rib 140*e* are connected by a fourth rib block 145*d*, the one end of the fifth rib 140*e* and the one end of the sixth rib 140*f* are connected by a fifth rib block 145*e*, the other end of the sixth rib 140*f* and the other end of the seventh rib 140*g* are connected by a sixth rib block 145*f*, and the one end of the seventh rib 140*g* and the one end of the eighth rib 140*h* are connected by a seventh rib block 145*g*. While the first rib block 145*a*, the third rib block 145*c*, and the fifth rib block 145*e* are configured to be disposed at the left side end of the porous ceramic foam, the second rib block 145*b*, the fourth rib block 145*d*, and the sixth rib block 145*f* are configured to be disposed at the right side end of the porous ceramic foam. The ribs 140 and the rib blocks 145 may be made of the same material.

An empty space between the first rib 140*a* and the second rib 140*b* constitutes a first channel 150*a*, an empty space between the second rib 140*b* and the third rib 140*c* constitutes a second channel 150*b*, an empty space between the third rib 140*c* and the fourth rib 140*d* constitutes a third channel 150*c*, an empty space between the fourth rib 140*d* and the fifth rib 140*e* constitutes a fourth channel 150*d*, an empty space between the fifth rib 140*e* and the sixth rib 140*f* constitutes a fifth channel 150*e*, an empty space between the sixth rib 140*f* and the seventh rib 140*g* constitutes a sixth channel 150*f*, and an empty space between the seventh rib 140*g* and the eighth rib 140*h* constitutes a seventh channel 150*g*.

The porous ceramic foam including the ribs 140 arranged in a serpentine shape and the channels 150 constituting the empty spaces between the ribs may be produced using the following method.

A hydrophobic coating film may be applied on the porous ceramic foam, which includes the ribs 140 arranged in a serpentine shape and the channels 150 constituting the empty spaces between the ribs, to suppress formation of water drops on a surface thereof. For the porous ceramic foam to have hydrophobicity, a porous ceramic material may be coated with a hydrophobic material to produce the porous ceramic foam. When the porous ceramic foam is hydrophilic, a large amount of water drops may be formed on the surface of the porous ceramic foam, and the filtering effect may be degraded. The hydrophobic coating film may have a thickness in a range of about 10 nm to 2 μm.

Hereinafter, a method of producing the porous ceramic foam including the ribs 140 arranged in a serpentine shape and the channels 150 constituting the empty spaces between the ribs will be described.

Figure 8:
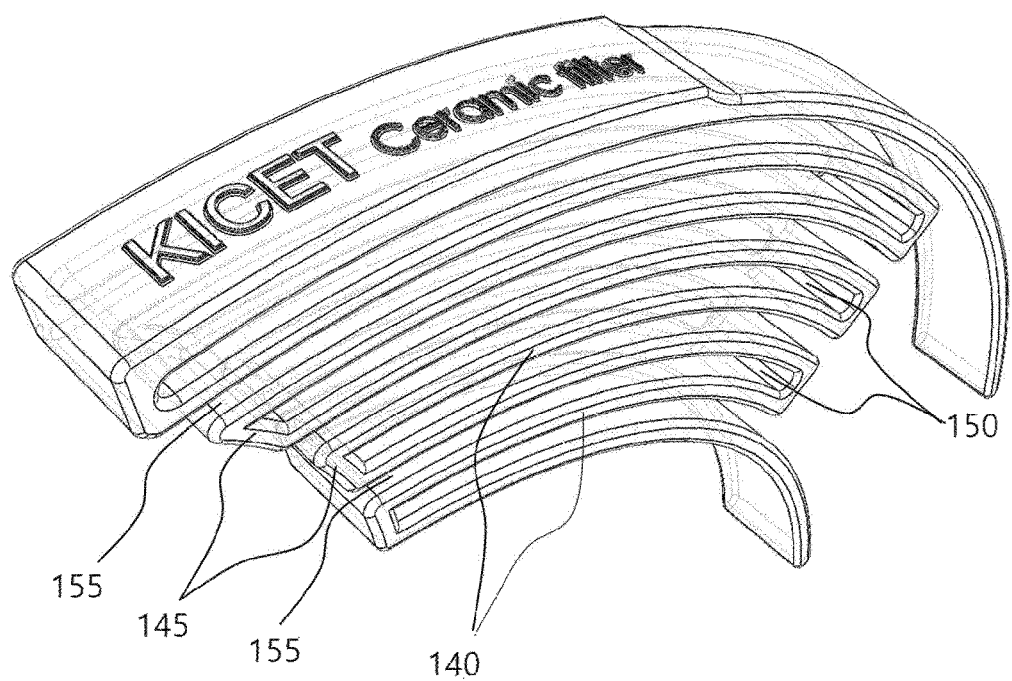
FIG. 8 and FIG. 9 are views schematically illustrating still another example of porous ceramic foam.
Figure 9:
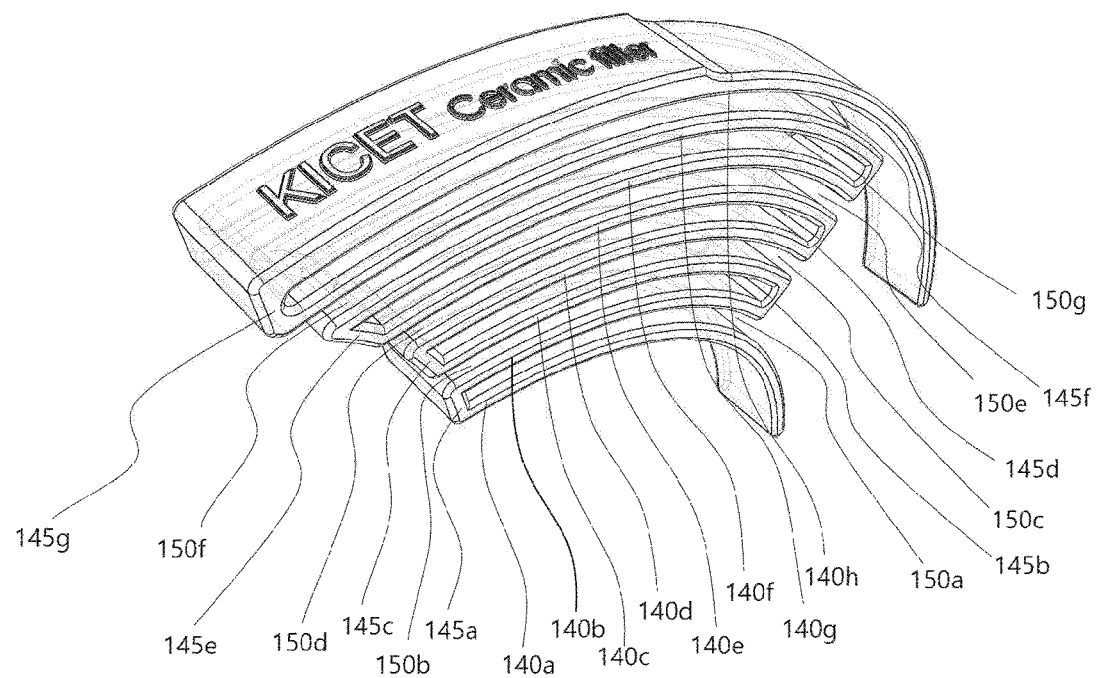
Figure 10:
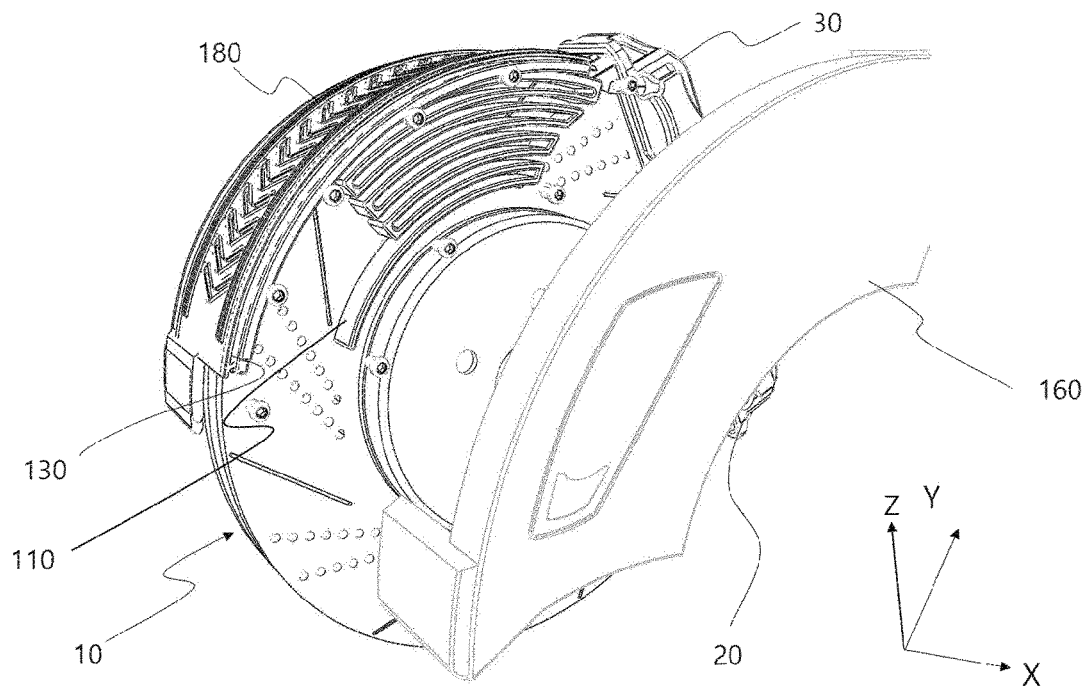
FIG. 10 is a schematic exploded perspective view of a portion of the collection apparatus to which the porous ceramic foam illustrated in FIGS. 8 and 9 is applied.
Figure 11:
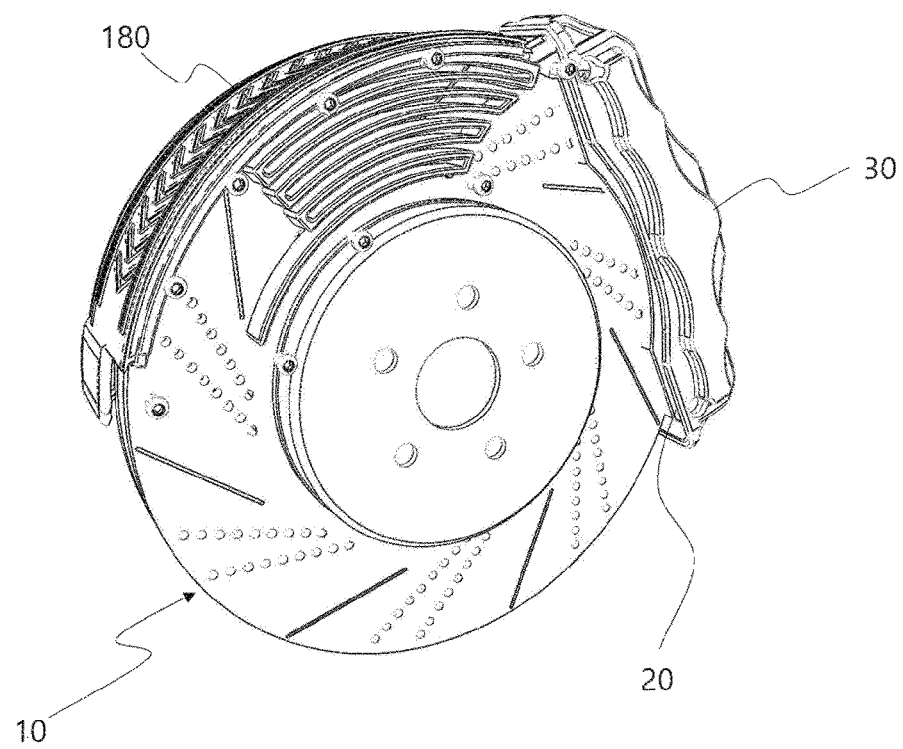
FIG. 11 is a view showing an example of a state in which the collection apparatus to which the porous ceramic foam illustrated in FIGS. 8 and 9 is applied is coupled to the brake system.

In order to produce the porous ceramic foam, porous polymer foam (e.g., polyurethane foam) is used as a substrate. The polymer foam is an elastic porous material like a sponge. The porosity, pore size, and the like of the polymer foam affect the porosity, pore size, and the like of the porous ceramic foam that is produced afterwards. The polymer foam is produced to correspond to the shape of porous ceramic foam to be produced. The polymer foam is produced to have a structure that includes ribs arranged in a serpentine shape and channels constituting empty spaces between the ribs as illustrated in FIGS. 8 and 9. In consideration of the complex shape (the serpentine or zigzag shape illustrated in FIGS. 8 and 9) of the polymer foam, injection molding or the like may be used to produce the polymer foam. After being produced, the polymer foam having the serpentine or zigzag shape is cleaned through ultrasonic cleaning or the like and dried. The drying may be performed in an oven at a temperature in a range of about 30° C. to 90° C., which is lower than a melting point of the polymer foam.

A starting material which includes a ceramic material, a binder, and a solvent is prepared. Subsequent processes are performed in the same manner as the method described above in the first embodiment in order to form the porous ceramic foam.

The porous ceramic foam produced as above is a porous body having numerous pores. The porous ceramic foam includes pores (cells) that serve as a passage through which particulate matter enters and a wall body that forms a strut of the porous ceramic foam between the pores (cells). The porous ceramic foam also includes the ribs 140 arranged in a serpentine shape and the channels 150 constituting the empty spaces between the ribs as illustrated in FIGS. 8 and 9.

A whisker may also be formed in the porous ceramic foam including the ribs 140 arranged in a serpentine shape and the channels 150 constituting the empty spaces between the ribs. More specifically, the porous ceramic foam may include pores (cells) that serve as a passage through which particulate matter enters and a wall body that forms a strut of the porous ceramic foam between the pores (cells) and may also include the ribs 140 arranged in a serpentine shape and the channels 150 constituting the empty spaces between the ribs, and a plurality of whiskers may protrude from a surface of the wall body toward the pores (cells).

The whisker may be made of one or more needle-shaped ceramic materials selected from the group consisting of mullite ($3Al_2O_3 \cdot 2SiO_2$), zinc oxide (ZnO), and silicon carbide (SiC). A plurality of whiskers protrude from a surface of the wall body toward the pores (cells). Accordingly, the particulate matter filtering effect can be maximized. The whiskers serve to effectively collect particulate matter while suppressing an increase in differential pressure during filtering.

Since a method of forming the whiskers on a surface of the porous ceramic foam is the same as the method described above in the first embodiment, detailed description thereof will be omitted.

Hereinafter, experimental examples according to the present invention will be presented in detail, but the present invention is not limited to the experimental examples presented below.

Experimental Example 1

In order to produce porous ceramic foam, porous polymer foam (more specifically, polyurethane foam) was used as a substrate. The polymer foam is an elastic porous material like a sponge. The polymer foam was cut to correspond to the size of samples to be produced, was cleaned through ultrasonic cleaning, and then was dried for 24 hours in an oven at a temperature of 70° C.

Figure 12:
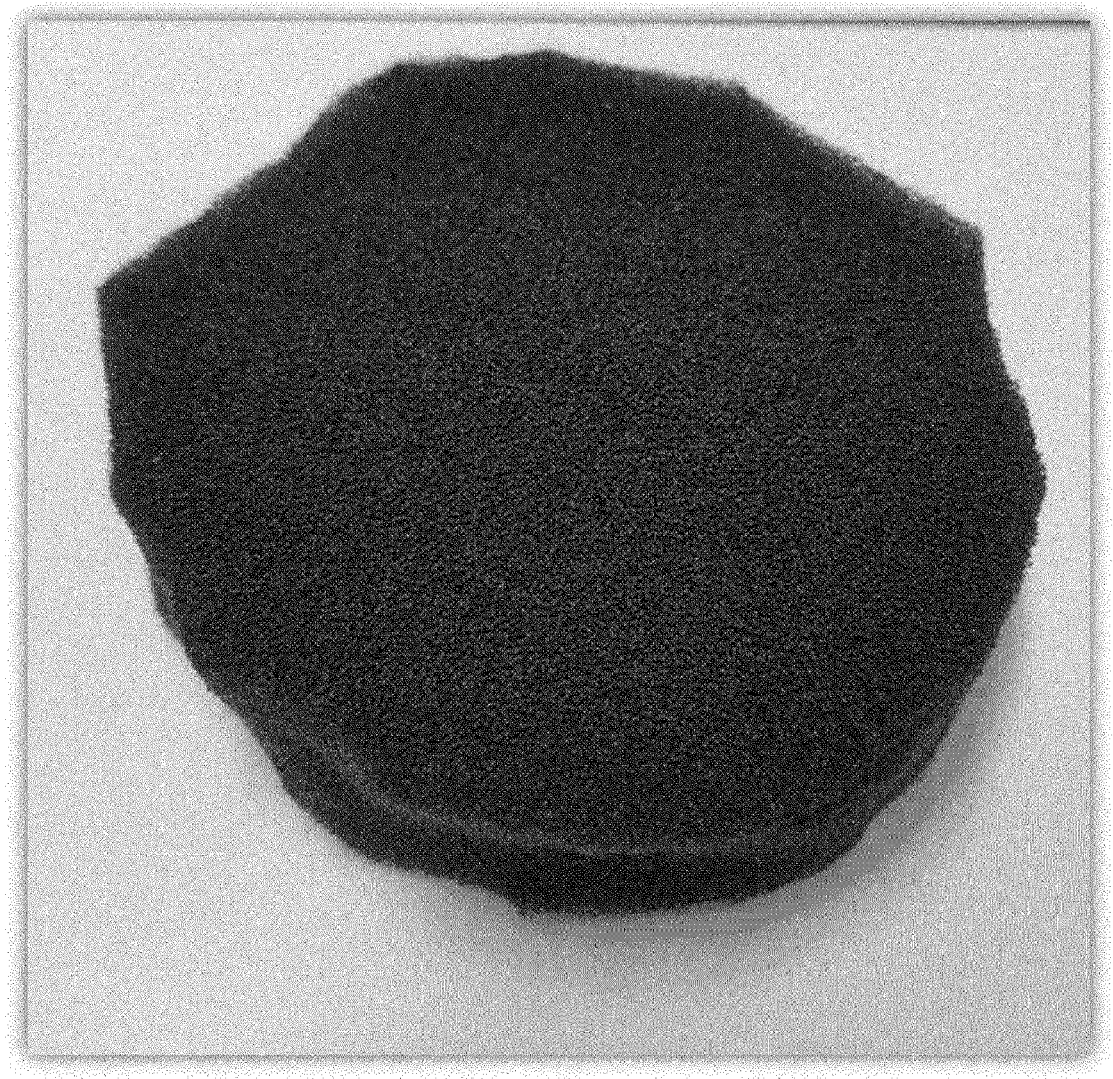
FIG. 12 is a picture showing polyurethane foam used as polymer foam in Experimental Example 1.

FIG. 12 is a picture showing the polyurethane foam used as the polymer foam in Experimental Example 1. Referring to FIG. 12, it can be seen that the polyurethane foam has a porous sponge-like form.

A solute and a solvent were prepared, and the solute and the solvent were set to have a weight ratio of 50:50. Alumina powder and glass frit were used as the solute. The alumina powder and glass frit were used in a weight ratio of 47.5:2.5. The alumina powder is the main material of the porous ceramic foam (ceramic porous body) to be produced, and the glass frit may not only serve to lower a sintering temperature and allow the porous ceramic foam itself to contain Si, but also serve to improve the growth of mullite. Distilled water was used as the solvent.

Distilled water was added as the solvent into a beaker, and then a magnetic bar was used to stir the solvent. In the meantime, a dispersant (BYK-111) was added in an amount of 1 part by weight based on 100 parts by weight of the solute. After the dispersant was added, stirring was performed for 30 minutes. Then, alumina powder was added as the main material to the solvent, and stirring was performed for 1 hour. Glass frit was added to the solvent having the alumina powder dispersed therein, stirring was performed for 1 hour, a polyvinyl alcohol (PVA) solution was added as a binder in an amount of 5 parts by weight based on 100 parts by weight of the solute, and stirring was performed for 1 hour to form a ceramic slurry. As the PVA solution, a solution in which PVA with a molecular weight of about 89,000 to 99,000 is dissolved at 10 wt % in distilled water was used. The PVA solution serves to improve adhesion of the ceramic slurry.

The ceramic slurry was dip-coated on the polymer foam. The polymer foam was completely dipped in the ceramic slurry, and dip coating was performed for 5 minutes in a vacuum atmosphere. After the dip coating, an external force was applied to compress the polymer foam to ⅔ or less its original thickness to remove excess slurry contained in the polymer foam and then the polymer foam was decompressed to allow the polymer foam to be restored to its original shape. In this way, some of the slurry contained in the polymer foam came out of the polymer foam.

Figure 13:
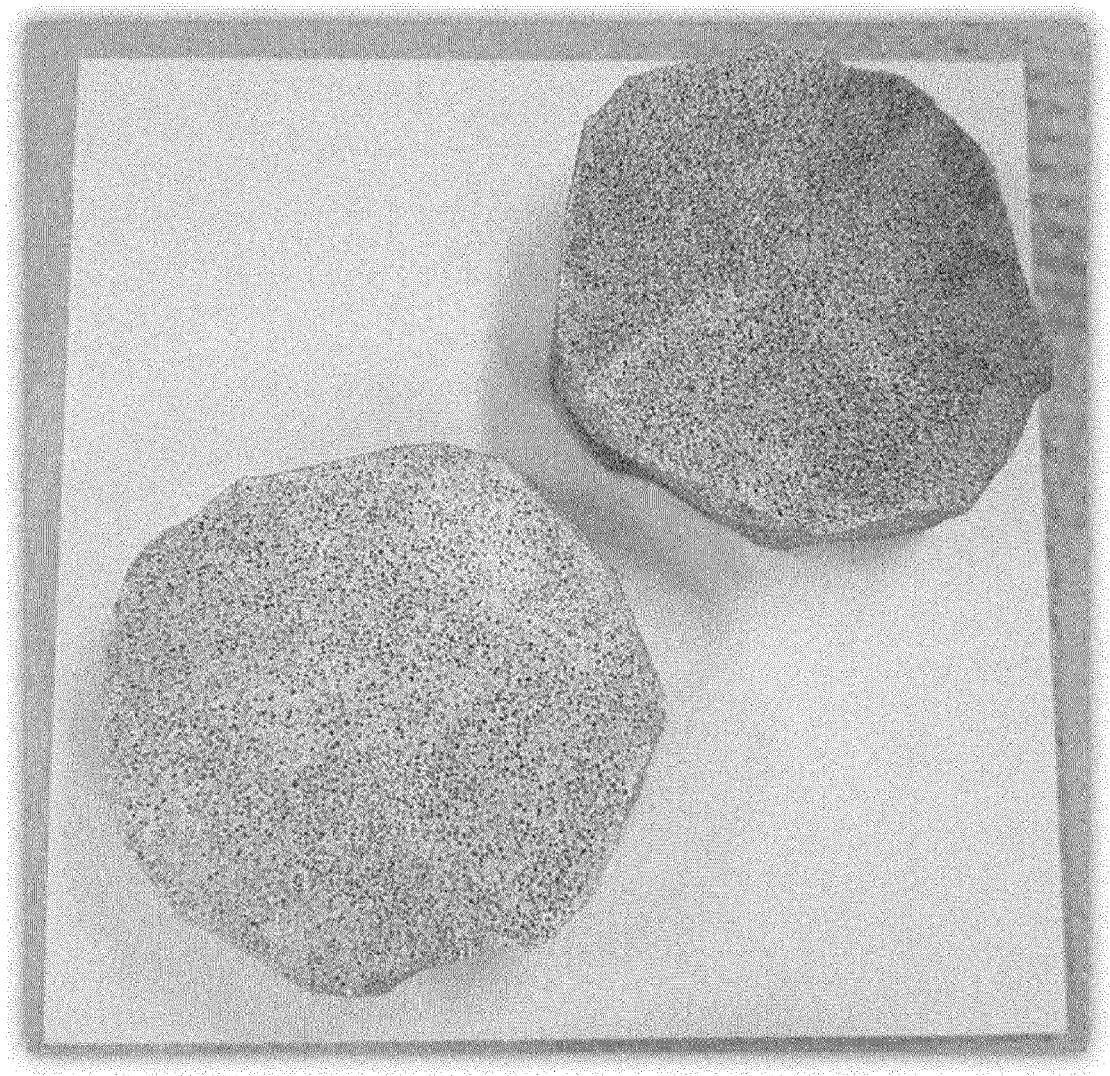
FIG. 13 is a picture showing a state in which a ceramic slurry is dip-coated on the polymer foam and dried.

The polymer foam on which the dip coating was performed was dried for 3 hours in an oven at a temperature of 80° C. FIG. 13 is a picture showing a state in which the ceramic slurry is dip-coated on the polymer foam and dried.

Figure 14:
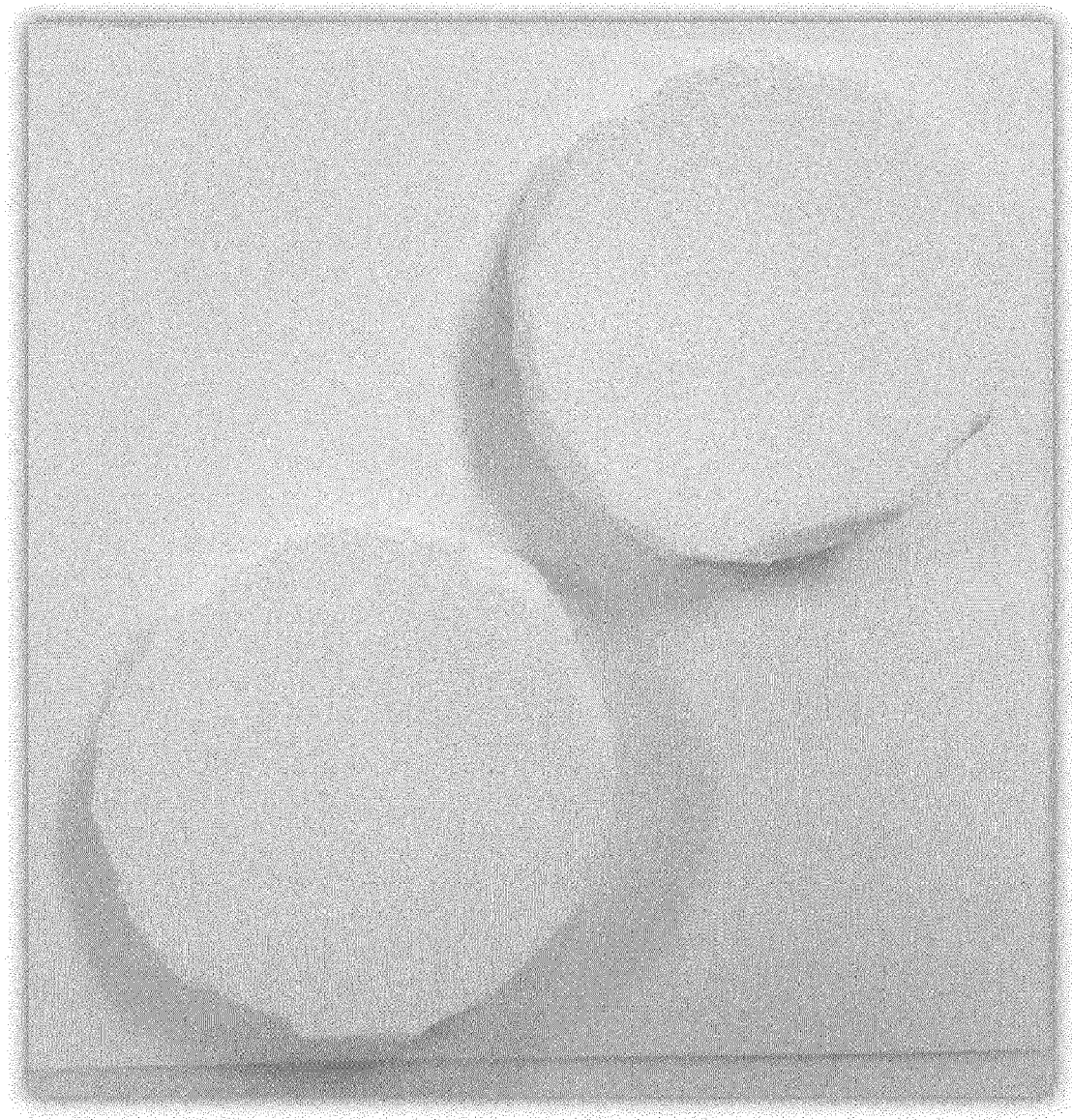
FIG. 14 is a picture showing porous ceramic foam produced according to Experimental Example 1.

The polymer foam on which the dip coating was performed was sintered. The polymer foam was charged into a furnace, the temperature in the furnace was raised to 550° C. at a rate of 5° C./min, 550° C. was maintained for 1 hour to remove the polymer component by burning, the temperature in the furnace was raised to 1,450° C. at a rate of 5° C./min, 1,450° C. was maintained for 3 hours to perform sintering, and then the furnace was cooled to obtain the porous ceramic foam. The sintering was performed in an air atmosphere. The porous ceramic foam produced in this way is shown in FIG. 14.

Figure 15:
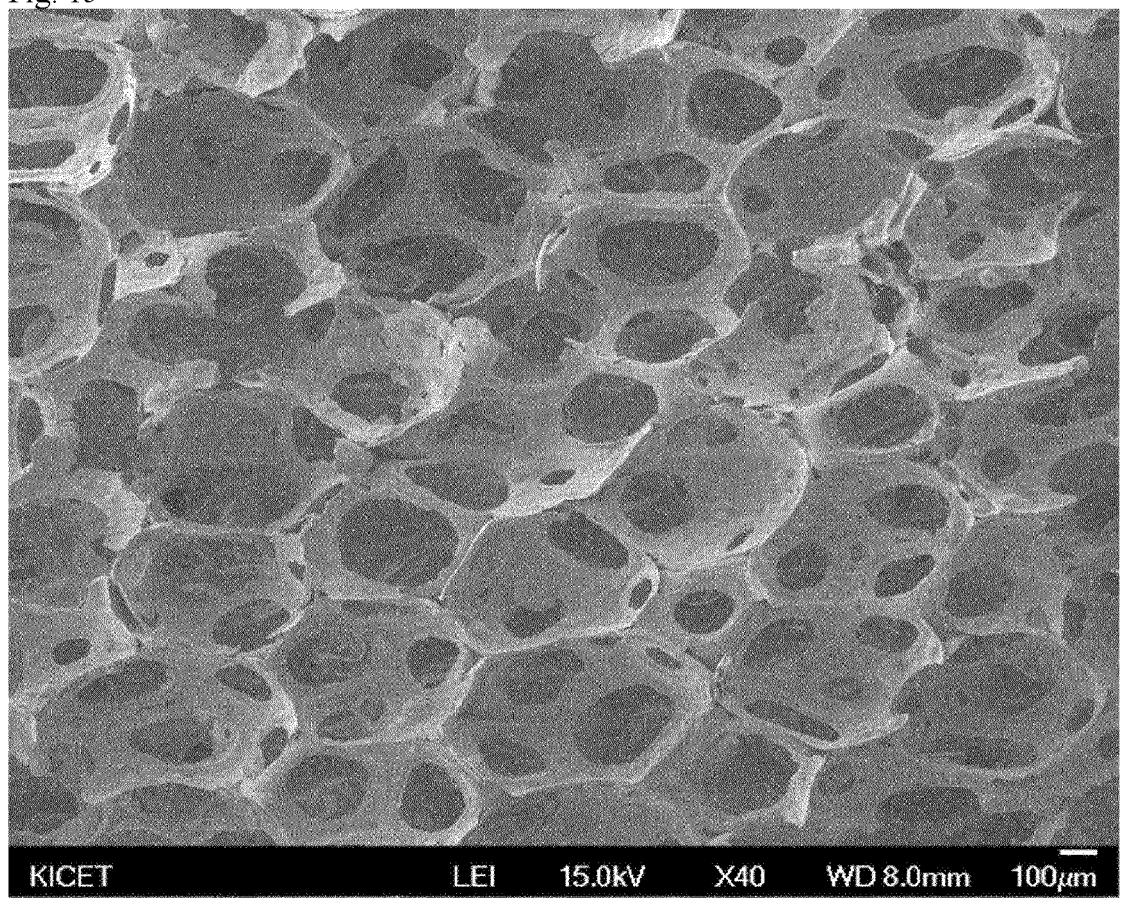
FIG. 15, FIG. 16 and FIG. 17 are pictures taken by a scanning electron microscope (SEM) that show a fine structure of the porous ceramic foam produced according to Experimental Example 1.
Figure 16:
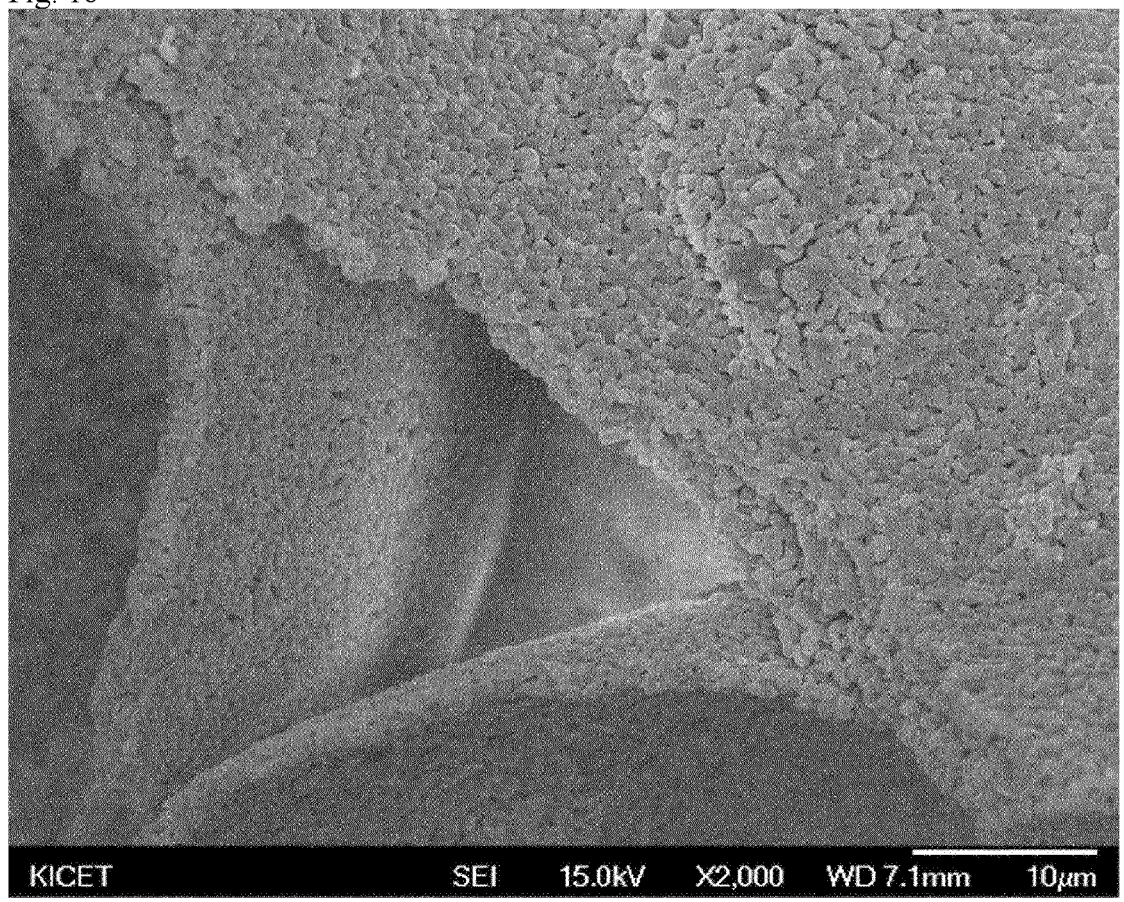
Figure 17:
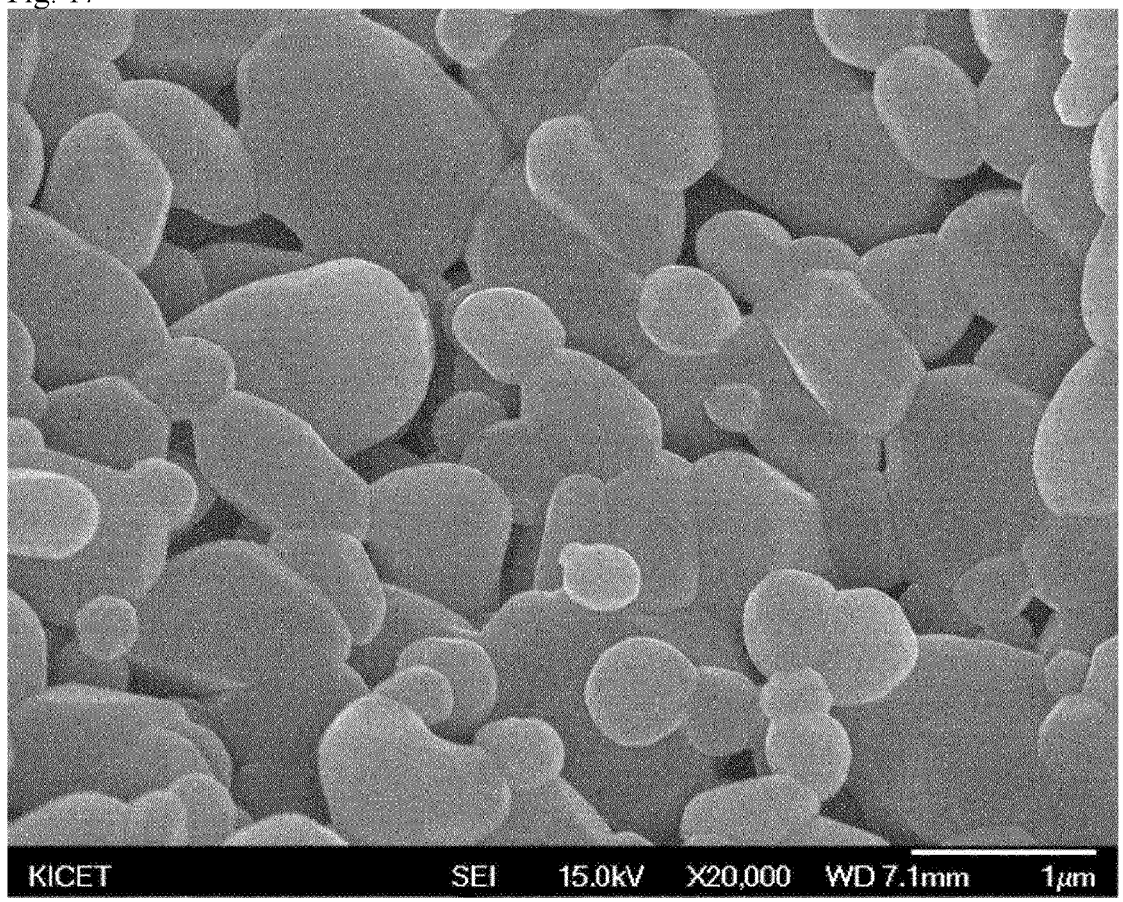

FIGS. 15 to 17 are pictures taken by a scanning electron microscope (SEM) that show a fine structure of the porous ceramic foam produced according to Experimental Example 1.

Referring to FIGS. 15 to 17, it can be seen that the porous ceramic foam is a porous body having numerous pores.

Experimental Example 2

The porous ceramic foam produced according to Experimental Example 1 was dipped in ethanol, ultrasonically cleaned, and then dried for 24 hours in an oven at a temperature of 75° C.

A solute and a solvent were prepared, and the solute and the solvent were set to have a weight ratio of 34.66:65.34. Mullite powder, $AlF_3$ powder, and a silica sol were used as the solute. The mullite powder, $AlF_3$ powder, and silica sol were used in a weight ratio of 13.33:13.33:8. The mullite powder served as a seed of mullite crystal growth, the $AlF_3$ powder served as a source of Al and F ions, and the silica sol served as a source of Si ions. Distilled water was used as the solvent.

Distilled water was added as the solvent into a beaker, and then a magnetic bar was used to stir the solvent. In the meantime, a dispersant (BYK-111) was added in an amount of 1 part by weight based on 100 parts by weight of the solute. After the dispersant was added, stirring was performed for 1 hour. Then, a silica sol was slowly added, and stirring was performed for 30 minutes. $AlF_3$ powder was added to the solvent having the silica sol added thereto, and stirring was performed for 1 hour. Mullite powder was added to the solvent having the $AlF_3$ powder added thereto, and stirring was performed for 1 hour. To the solvent having the mullite powder added thereto, a carboxylic methyl cellulose (CMC) solution was added as a thickener in an amount of 5 parts by weight based on 100 parts by weight of the solute, stirring was performed for 30 minutes, a PVA solution was added as a binder in an amount of 5 parts by weight based on 100 parts by weight of the solute, and stirring was performed for 1 hour to form a ceramic slurry. As the CMC solution, a solution in which CMC is dissolved at 0.1 wt % in distilled water was used. The CMC solution serves to increase the viscosity of the coating solution to decrease a settling rate thereof. As the PVA solution, a solution in which PVA with a molecular weight of about 89,000 to 99,000 is dissolved at 10 wt % in distilled water was used. The PVA solution serves to improve adhesion of the ceramic slurry.

The ceramic slurry was dip-coated on the porous ceramic foam produced according to Experimental Example 1. The porous ceramic foam was completely dipped in the ceramic slurry, and dip coating was performed for 5 minutes in a vacuum atmosphere.

The porous ceramic foam on which the dip coating was performed was dried for 3 hours in an oven at a temperature of 80° C.

Figure 18:
FIG. 18 is a picture showing porous ceramic foam having whiskers formed therein according to Experimental Example 2.
Figure 19:
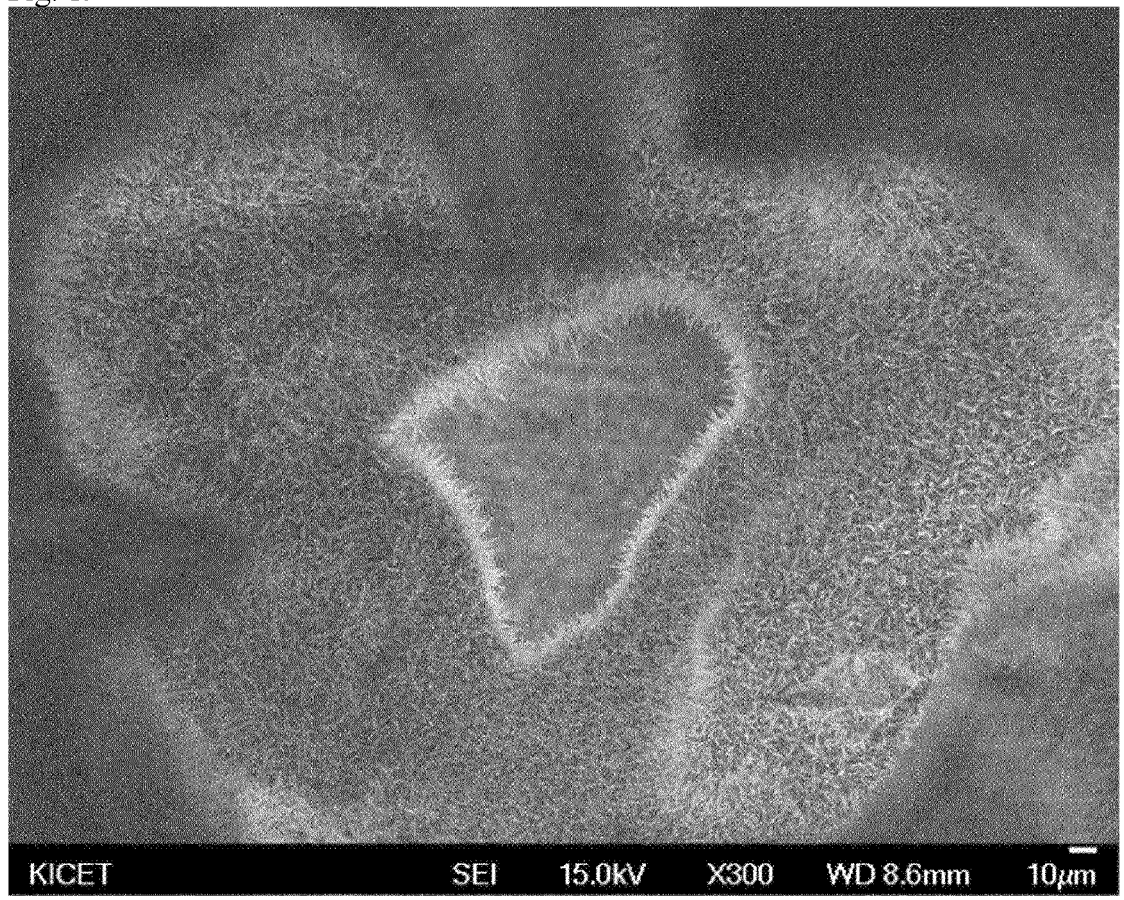
FIG. 19, FIG. 20, FIG. 21, FIG. 22, FIG. 23, FIG. 24, FIG. 25 and FIG. 26 are pictures taken by the SEM that show a fine structure of the porous ceramic foam having the whiskers formed therein according to Experimental Example 2.
Figure 20:
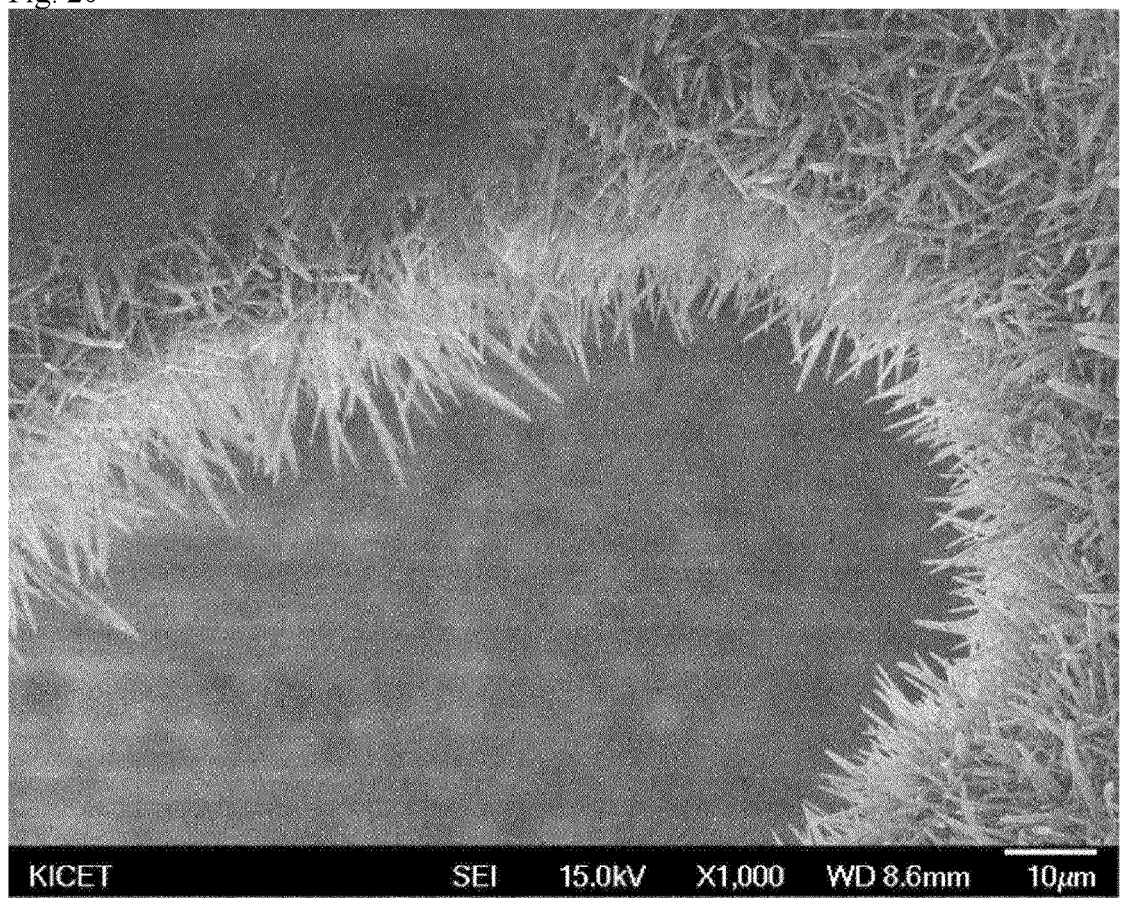
Figure 21:
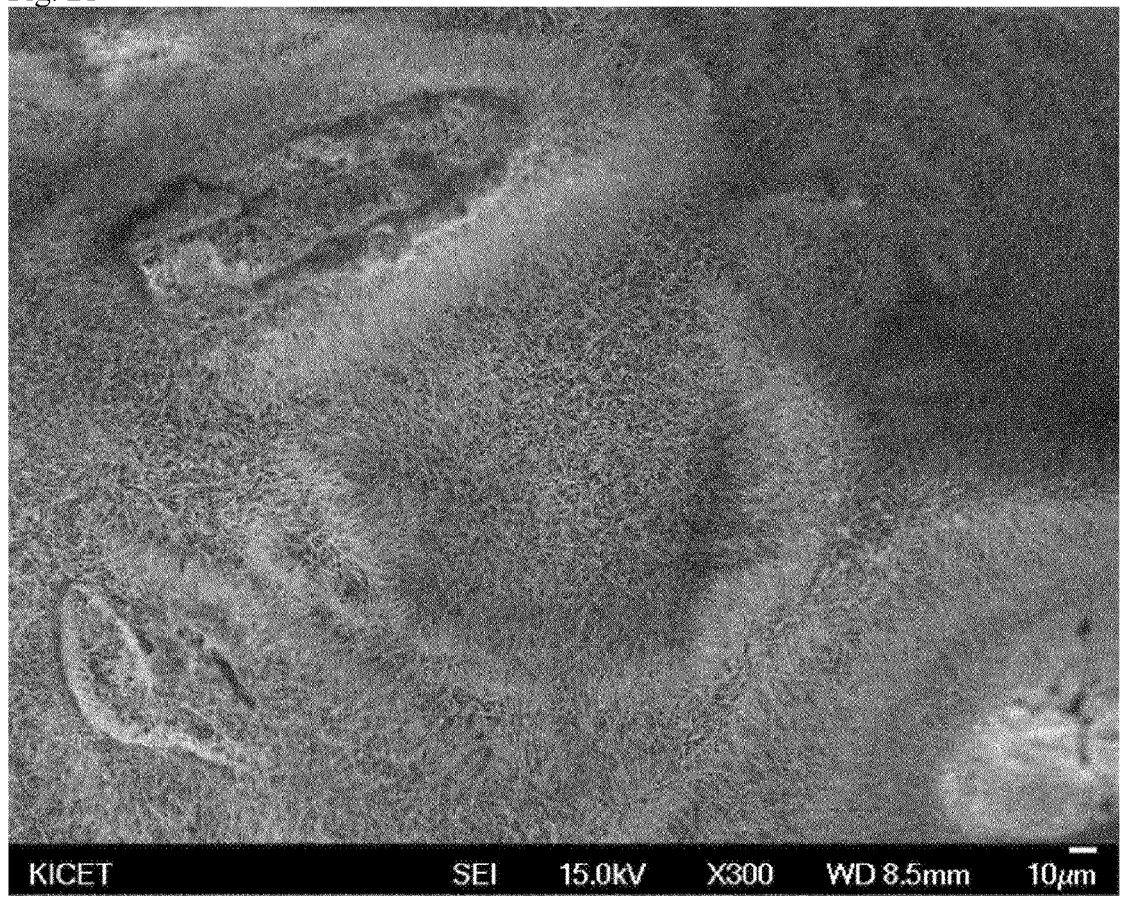
Figure 22:
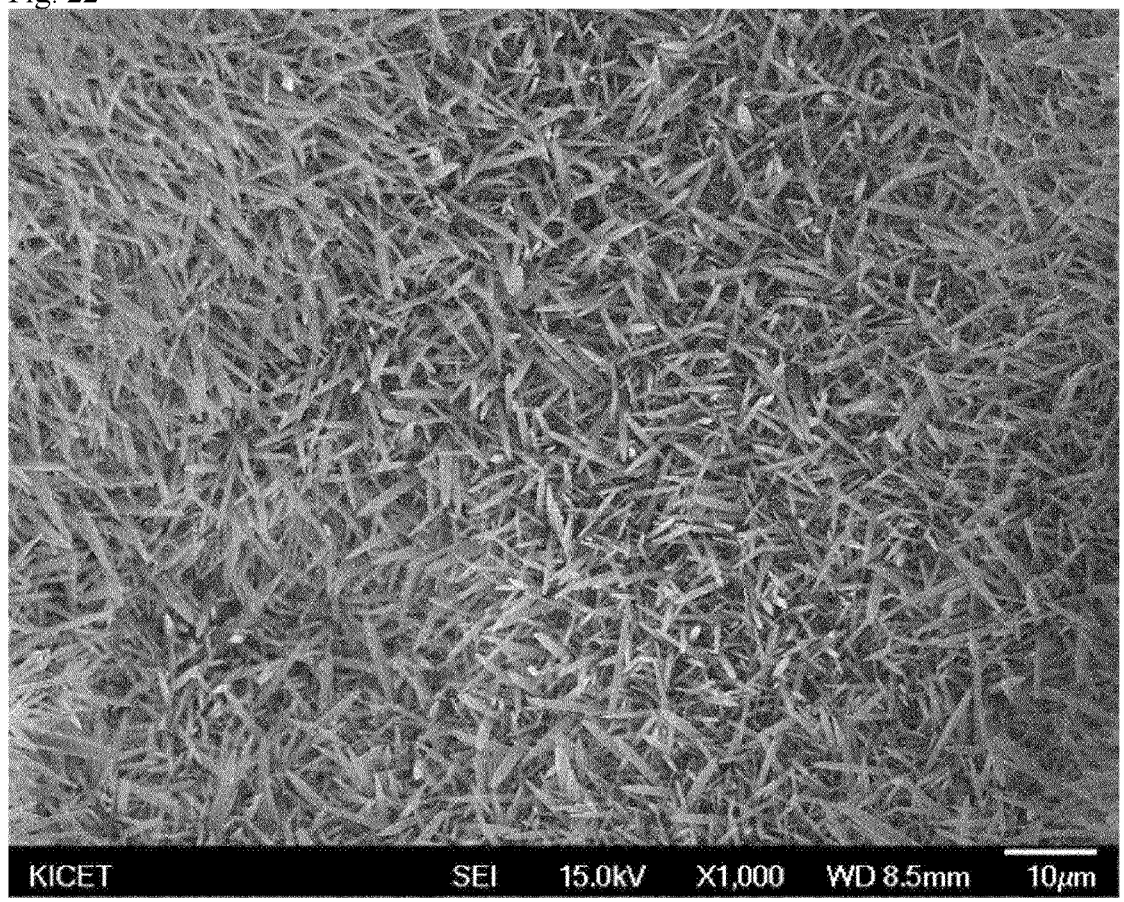
Figure 23:
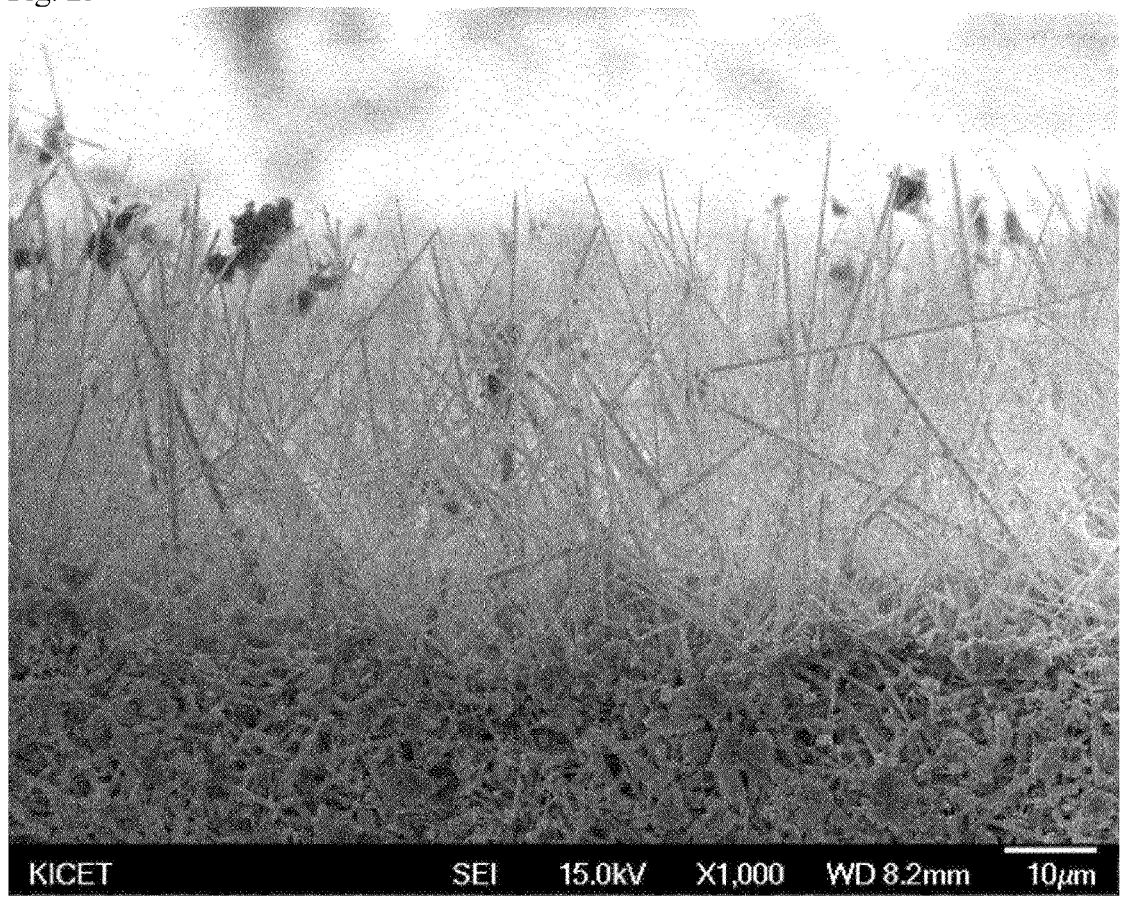
Figure 24:
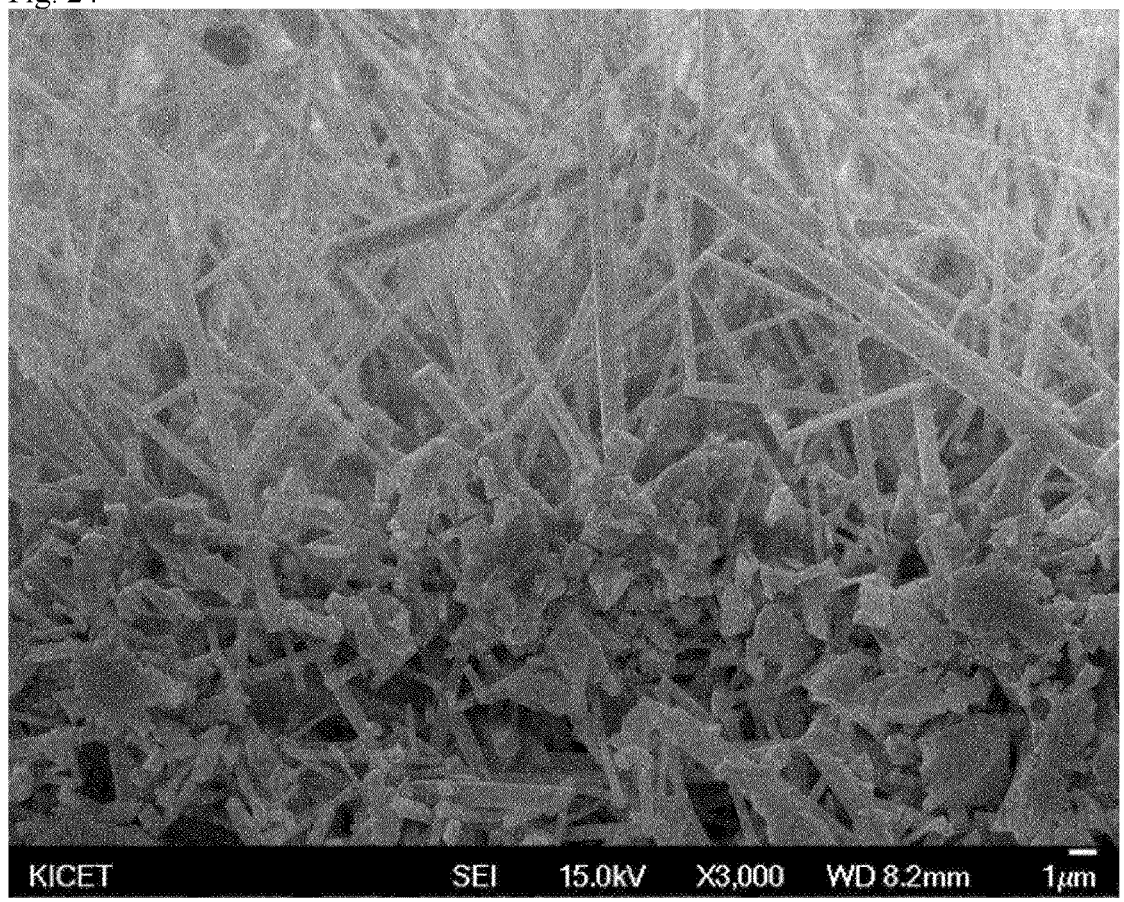
Figure 25:
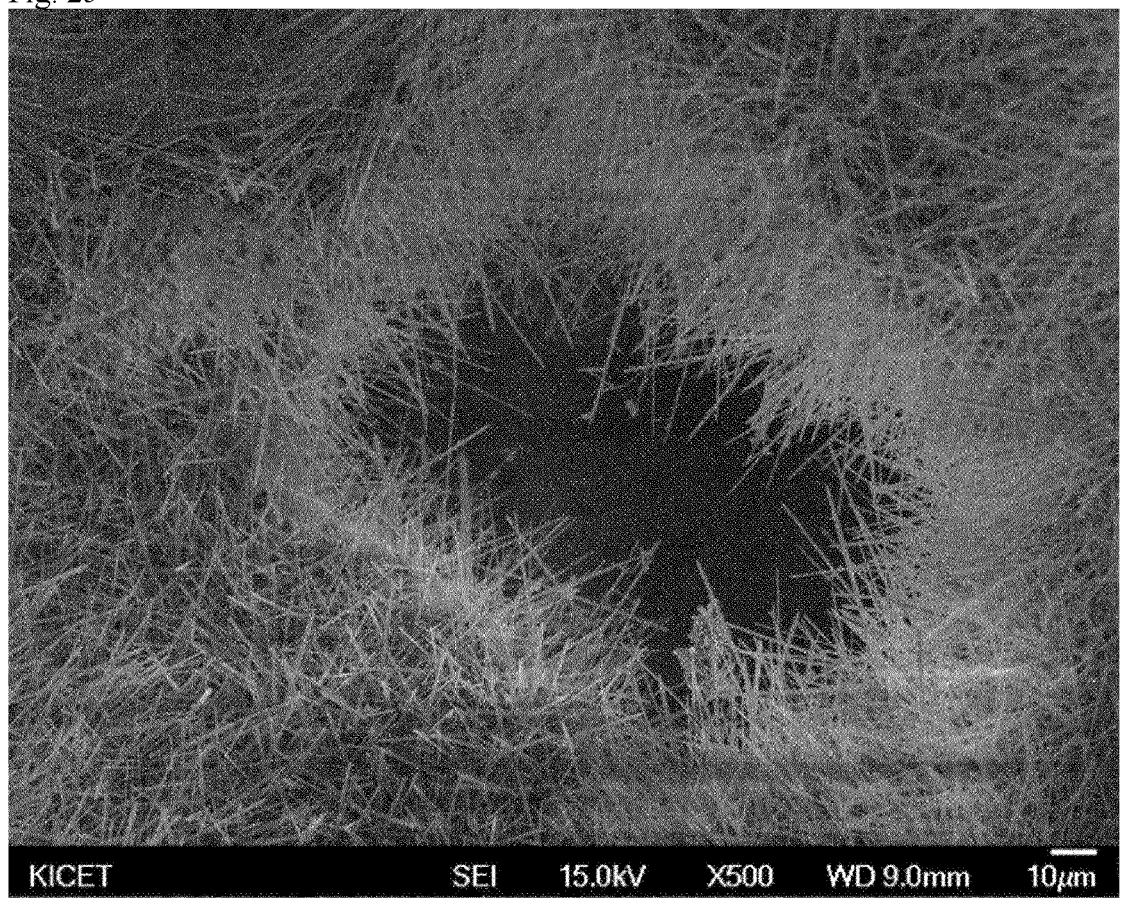
Figure 26:
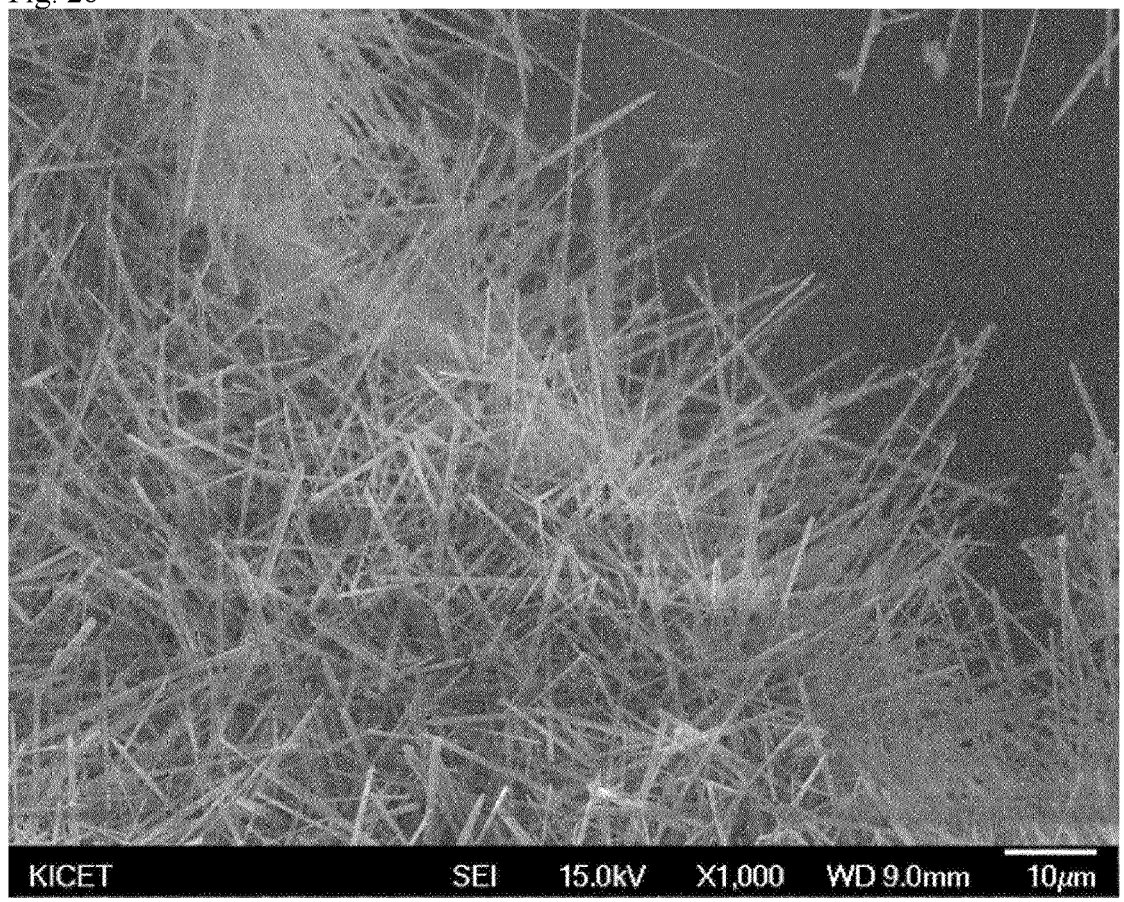

The porous ceramic foam on which the dip coating was performed was sintered. The porous ceramic foam was charged into a furnace, the temperature in the furnace was raised to 1,400° C. at a rate of 5° C./min, 1,400° C. was maintained for 3 hours to perform sintering, and then the furnace was cooled to obtain the porous ceramic foam having whiskers formed therein. The sintering was performed in an air atmosphere. The porous ceramic foam having whiskers formed therein according to Experimental Example 2 is shown in FIG. 18.

FIGS. 19 to 26 are pictures taken by the SEM that show a fine structure of the porous ceramic foam having the whiskers formed therein according to Experimental Example 2.

Referring to FIGS. 19 to 26, it can be seen that the porous ceramic foam is a porous body having numerous pores. Also, it can be seen that whiskers are formed in the porous ceramic foam.

Experimental Example 3

The porous ceramic foam produced according to Experimental Example 1 was dipped in ethanol, ultrasonically cleaned, and then dried for 24 hours in an oven at a temperature of 75° C.

A solute and a solvent were prepared, and the solute and the solvent were set to have a weight ratio of 20:80. Alumina powder that is the same material as alumina, which was the main component of the porous ceramic foam, was used as the solute.

Distilled water was added as the solvent into a beaker, and then a magnetic bar was used to stir the solvent. In the meantime, a dispersant (Darvan C) was added in an amount of 10 parts by weight based on 100 parts by weight of the solute. After the dispersant was added, stirring was performed for 1 hour. Then, alumina powder was added, and stirring was performed for 1 hour. To the solvent having alumina powder added thereto, a PVA solution was added as a binder in an amount of 50 parts by weight based on 100 parts by weight of the solute, and stirring was performed for 1 hour to form a ceramic slurry. As the PVA solution, a solution in which PVA with a molecular weight of about 89,000 to 99,000 is dissolved at 10 wt % in distilled water was used. The PVA solution serves to improve adhesion of the ceramic slurry.

The ceramic slurry was coated on a surface of the porous ceramic foam produced according to Experimental Example 1. The coating was selectively performed by dipping only an end portion (surface) of the porous ceramic foam to be coated and then taking out the same instead of completely dipping the porous ceramic foam in the ceramic slurry. When the coating is performed in this way, only a selected portion to be coated may be coated instead of coating the entire porous ceramic foam, the slurry is coated only to a predetermined depth from the surface of the porous ceramic foam, and in the portion coated with the slurry, relatively smaller pores (pores having a first size) are distributed as compared to an uncoated portion. The portion not coated with the slurry becomes an area (a second area) of the porous ceramic foam that has relatively larger pores (pores having a second size), and the portion coated with the slurry becomes an area (a first area) of the porous ceramic foam that has relatively smaller pores (pores having the first size).

The porous ceramic foam on which the coating was selectively performed was dried for 3 hours in an oven at a temperature of 80° C.

The porous ceramic foam on which the coating was selectively performed was sintered. The porous ceramic foam on which the coating was selectively performed was charged into a furnace, the temperature in the furnace was raised to 550° C. at a rate of 5° C./min, 550° C. was maintained for 1 hour to remove the polymer component by burning, the temperature in the furnace was raised to 1,250° C. at a rate of 5° C./min, 1,250° C. was maintained for 3 hours to perform sintering, and then the furnace was cooled to obtain the porous ceramic foam. The sintering was performed in an air atmosphere.

The porous ceramic foam produced as above includes a first area A having relatively smaller pores (pores having the first size) as compared to a second area B and the second area B having relatively larger pores (pores having the second size) as compared to the first area A.

Experimental Example 4

In order to produce the porous ceramic foam including the first area A and the second area B, two porous polymer foams (more specifically, polyurethane foams) were used as substrates. As the two polymer foams (a first polymer foam and a second polymer foam), polymer foams having different pore sizes (pores per inch (PPI)) were used. For example, an average pore size of the first polymer foam was smaller than an average pore size of the second polymer foam. The first and second polymer foams are an elastic porous material like a sponge. The first and second polymer foams were cut to correspond to the size of samples to be produced, were cleaned through ultrasonic cleaning, and were dried for 24 hours in an oven at a temperature of 70° C.

A solute and a solvent were prepared, and the solute and the solvent were set to have a weight ratio of 50:50. Alumina powder and glass frit were used as the solute. The alumina powder and glass frit were used in a weight ratio of 47.5:2.5. The alumina powder is the main material of the porous ceramic foam (ceramic porous body) to be produced, and the glass frit may not only serve to lower a sintering temperature and allow the porous ceramic foam itself to contain Si, but also serve to improve the growth of mullite. Distilled water was used as the solvent.

Distilled water was added as the solvent into a beaker, and then a magnetic bar was used to stir the solvent. In the meantime, a dispersant (BYK-111) was added in an amount of 1 part by weight based on 100 parts by weight of the solute. After the dispersant was added, stirring was performed for 30 minutes. Then, alumina powder was added as the main material to the solvent, and stirring was performed for 1 hour. Glass frit was added to the solvent having the alumina powder dispersed therein, stirring was performed for 1 hour, a PVA solution was added as a binder in an amount of 5 parts by weight based on 100 parts by weight of the solute, and stirring was performed for 1 hour to form a ceramic slurry. As the PVA solution, a solution in which PVA with a molecular weight of about 89,000 to 99,000 is dissolved at 10 wt % in distilled water was used. The PVA solution serves to improve adhesion of the ceramic slurry.

The ceramic slurry was dip-coated on the first and second polymer foams. The first and second polymer foams were completely dipped in the ceramic slurry, and dip coating was performed for 5 minutes in a vacuum atmosphere. After the dip coating, an external force was applied to compress the first and second polymer foams to ⅔ or less their original thickness to remove excess slurry contained in the first and second polymer foams and then the first and second polymer foams were decompressed to allow the first and second polymer foams to be restored to their original shape. In this way, some of the slurry contained in the first and second polymer foams came out of the first and second polymer foams.

The first polymer foam on which the dip coating was performed and the second polymer foam on which the dip coating was performed were overlapped and dried in an overlapping state for 3 hours in an oven at a temperature of 80° C.

The product of overlapping and drying the first polymer foam and the second polymer foam was sintered. The product of overlapping and drying the first polymer foam and the second polymer foam was charged into a furnace, the temperature in the furnace was raised to 550° C. at a rate of 5° C./min, 550° C. was maintained for 1 hour to remove the polymer components by burning, the temperature in the furnace was raised to 1,450° C. at a rate of 5° C./min, 1,450° C. was maintained for 3 hours to perform sintering, and then the furnace was cooled to obtain the porous ceramic foam. The sintering was performed in an air atmosphere. When the first polymer foam and the second polymer foam which are coated with the ceramic slurry are overlapped and sintered, a porous ceramic foam that consists of a single body is formed. Polymer foams having different pore sizes (pores per inch (PPI)) are used as the first polymer foam and the second polymer foam, and thus an area where the first polymer foam was present and an area where the second polymer foam was present have different pore sizes. Accordingly, it is possible to obtain the porous ceramic foam in which an area (the first area) having relatively smaller pores (pores having the first size) as compared to the second area and an area (the second area) having relatively larger pores (pores having the second size) as compared to the first area are separate from each other.

Experimental Example 5

The porous ceramic foam produced according to Experimental Example 1 was dipped in ethanol, ultrasonically cleaned, and then dried for 24 hours in an oven at a temperature of 75° C.

Ethanol was added as a solvent into a beaker, and then zinc nitrate hexahydrate ($Zn(NO_3)_2 \cdot 6H_2O$) was added and stirring was performed for 1 hour to form a seed solution. Zinc nitrate hexahydrate ($Zn(NO_3)_2 \cdot 6H_2O$) was added so that a weight ratio of zinc nitrate hexahydrate ($Zn(NO_3)_2 \cdot 6H_2O$) and ethanol was 6:94. Zinc nitrate hexahydrate ($Zn(NO_3)_2 \cdot 6H_2O$) serves as a source of Zn.

The seed solution was dip-coated on the polymer foam produced according to Experimental Example 1. The porous ceramic foam was completely dipped in the seed solution, and dip coating was performed for 20 minutes in a vacuum atmosphere.

The porous ceramic foam on which the dip coating was performed was annealed for 3 hours in an oven at a temperature of 200° C. The annealing allows the seed solution to be well adhered to the porous ceramic foam.

Ethanol was added as a solvent into a beaker, and then zinc nitrate hexahydrate ($Zn(NO_3)_2 \cdot 6H_2O$) and hexamethylenetetramine powder were added. A PVA solution was added thereto, and then stirring was performed for 1 hour to form a growth solution. Zinc nitrate hexahydrate ($Zn(NO_3)_2 \cdot 6H_2O$) and hexamethylenetetramine powder were added so that a weight ratio of zinc nitrate hexahydrate ($Zn(NO_3)_2 \cdot 6H_2O$), hexamethylenetetramine powder, and ethanol was 0.004:0.002:99.994. Zinc nitrate hexahydrate ($Zn(NO_3)_2 \cdot 6H_2O$) serves as a source of Zn, and hexamethylenetetramine powder serves as a source of Al and F. As the PVA solution, a solution in which PVA with a molecular weight of about 89,000 to 99,000 is dissolved at 10 wt % in distilled water was used. The PVA solution serves to improve adhesion of the growth solution.

The annealed porous ceramic foam was dipped in the growth solution and coated therewith. The temperature of the growth solution was set to 95° C., and the porous ceramic foam was dipped in the growth solution for 24 hours so as to be coated therewith.

The porous ceramic foam coated with the growth solution was placed in the beaker containing distilled water and was cleaned by gentle shaking.

The cleaned porous ceramic foam was sintered. The porous ceramic foam was charged into a furnace, the temperature in the furnace was raised to 1,200° C. at a rate of 5° C./min, 1,200° C. was maintained for 1 hour to perform sintering, and then the furnace was cooled to obtain the porous ceramic foam having whiskers made of ZnO formed therein. The sintering was performed in an air atmosphere.

Experimental Example 6

In order to produce porous ceramic foam, porous polymer foam (more specifically, polyurethane foam) was used as a substrate. The polymer foam is an elastic porous material like a sponge. The polymer foam was cut to correspond to the size of samples to be produced, was cleaned through ultrasonic cleaning, and then was dried for 24 hours in an oven at a temperature of 70° C.

A solute and a solvent were prepared, and the solute and the solvent were set to have a weight ratio of 50:50. Silicon carbide powder and glass frit were used as the solute. The silicon carbide powder and glass frit were used in a weight ratio of 47.5:2.5. The silicon carbide powder is the main material of the porous ceramic foam (ceramic porous body) to be produced, and the glass frit may not only serve to lower a sintering temperature and allow the porous ceramic foam itself to contain Si, but also serve to improve growth of SiC. Distilled water was used as the solvent.

Distilled water was added as the solvent into a beaker, and then a magnetic bar was used to stir the solvent. In the meantime, a dispersant (BYK-111) was added in an amount of 1 part by weight based on 100 parts by weight of the solute. After the dispersant was added, stirring was performed for 30 minutes. Then, silicon carbide powder was added as the main material to the solvent, and stirring was performed for 1 hour. Glass frit was added to the solvent having the silicon carbide powder dispersed therein, stirring was performed for 1 hour, a PVA solution was added as a binder in an amount of 5 parts by weight based on 100 parts by weight of the solute, and stirring was performed for 1 hour to form a ceramic slurry. As the PVA solution, a solution in which PVA with a molecular weight of about 89,000 to 99,000 is dissolved at 10 wt % in distilled water was used. The PVA solution serves to improve adhesion of the ceramic slurry.

The ceramic slurry was dip-coated on the polymer foam. The polymer foam was completely dipped in the ceramic slurry, and dip coating was performed for 5 minutes in a vacuum atmosphere. After the dip coating, an external force was applied to compress the polymer foam to ⅔ or less its original thickness to remove excess slurry contained in the polymer foam and then the polymer foam was decompressed to allow the polymer foam to be restored to its original shape. In this way, some of the slurry contained in the polymer foam came out of the polymer foam.

The polymer foam on which the dip coating was performed was dried for 3 hours in an oven at a temperature of 80° C.

The polymer foam on which the dip coating was performed was sintered. The polymer foam was charged into a furnace, the temperature in the furnace was raised to 550° C. at a rate of 5° C./min, 550° C. was maintained for 1 hour to remove the polymer component by burning, the temperature in the furnace was raised to 1,450° C. at a rate of 5° C./min, 1,450° C. was maintained for 3 hours to perform sintering, and then the furnace was cooled to obtain the porous ceramic foam. The sintering was performed in a reducing atmosphere.

The porous ceramic foam produced as above was dipped in ethanol, ultrasonically cleaned, and then dried for 24 hours in an oven at a temperature of 75° C.

The dried porous ceramic foam was placed inside a tube furnace at the center thereof, and silica powder and carbon powder to be used as sources of whisker growth were mounted on an alumina plate at the inlet of the tube furnace. The silica powder and carbon powder were set to have a weight ratio of 1:1.6. Argon (Ar) was used as a carrier gas, and a flow rate of the carrier gas was set to 0.2 L/min. A reaction temperature was set to 1,450° C., and 1,450° C. was maintained for 4 hours to cause the growth of SiC whiskers.

Exemplary embodiments of the present invention have been described in detail above, but the present invention is not limited to the above embodiments, and various modifications may be made by those of ordinary skill in the art.

DESCRIPTION OF REFERENCE NUMERALS

10: rotor
20: brake pad
30: brake caliper
110: first collector
120: second collector
130: upper collector
140: rib
150: channel
155: inlet
160: first collector cover
170: second collector cover
180: upper collector cover

The invention claimed is:

1. A collection apparatus for collecting particulate matter generated due to friction between a rotor and a brake pad in a brake system of a transport facility, the collection apparatus comprising:
a first collector configured to surround a portion of an outer side surface of the rotor;
an upper collector configured to surround a portion of an outer peripheral surface of the rotor; and
a second collector configured to surround a portion of an inner side surface of the rotor,
wherein the first collector and the second collector are made of porous ceramic foam,
wherein the porous ceramic foam is coated with a hydrophobic coating film and shows hydrophobicity.

2. The collection apparatus of claim 1, wherein the collection apparatus is provided to have a U-shaped exterior as a whole and configured to accommodate a portion of the rotor inside the U-shape.

3. The collection apparatus of claim 1, wherein:
the first collector is disposed to face the outer side surface of the rotor;
the second collector is disposed to face the inner side surface of the rotor;
the second collector is disposed at the opposite side of the first collector with respect to the rotor which has a disc shape; and
the first collector and the second collector are disposed to face each other with respect to the rotor.

4. The collection apparatus of claim 1, further comprising:
a first collector cover configured to cover and protect the first collector and suppress particulate matter entering the first collector from leaking to the outside; and
a second collector cover configured to cover and protect the second collector and suppress particulate matter entering the second collector from leaking to the outside.

5. The collection apparatus of claim 1, wherein an upper collector cover configured to protect the upper collector is further provided on an upper portion of the upper collector.

6. The collection apparatus of claim 5, wherein holes are formed in the upper collector cover to allow clean air filtered by the upper collector to be discharged to the outside.

7. The collection apparatus of claim 1, wherein the porous ceramic foam is made of one or more ceramic materials selected from the group consisting of alumina ($Al_2O_3$), cordierite ($2MgO \cdot 2A_2O_3 \cdot 5SiO_2$), mullite ($3Al_2O_3 \cdot 2SiO_2$), and silicon carbide (SiC).

8. The collection apparatus of claim 1, wherein the porous ceramic foam has a porosity in a range of 40% to 90%.

9. The collection apparatus of claim 1, wherein the porous ceramic foam includes:
pores (cells) that serve as a passage through which particulate matter enters; and
a wall body that forms a strut of the porous ceramic foam between the pores (cells), and
a plurality of whiskers protrude from a surface of the wall body toward the pores (cells).

10. The collection apparatus of claim 9, wherein the whisker is made of one or more needle-shaped ceramic materials selected from the group consisting of mullite ($3Al_2O_3 \cdot 2SiO_2$), zinc oxide (ZnO), and silicon carbide (SiC).

11. The collection apparatus of claim 1, wherein the porous ceramic foam includes:
- a first area in which relatively smaller pores are distributed as compared to a second area; and
- the second area in which relatively larger pores are distributed as compared to the first area, and
- the first area is able to collect particulate matter of a smaller size than particulate matter collected by the second area.

12. The collection apparatus of claim 11, wherein the second area is disposed to be more adjacent to the rotor than the first area.

13. The collection apparatus of claim 1, wherein the upper collector is made of the porous ceramic foam.

14. The collection apparatus of claim 1, wherein the first collector and the second collector are made of porous ceramic foam having a stepped portion that protrudes to cover a portion of the outer peripheral surface of the rotor.

15. The collection apparatus of claim 1, wherein the first collector and the second collector include ribs arranged in a serpentine shape and a channel that constitutes an empty space between one rib and another rib.

16. The collection apparatus of claim 15, wherein the ribs are formed in a curved shape.

17. The collection apparatus of claim 15, wherein, in the first collector and the second collector, a rib block is disposed at an end portion of the rib, the rib block is a medium configured to connect one rib to another rib, particulate matter generated due to friction between the rotor and the brake pad enters through an inlet of the channel, an empty space between the inlet of the channel and the rib block is an area constituting the channel in a Y-axis direction perpendicular to an X-axis which is an axis of rotation of the rotor, and an empty space between one rib and another rib is an area constituting the channel in a Z-axis direction perpendicular to the X-axis and Y-axis.

* * * * *